(12) United States Patent
Bors

(10) Patent No.: US 6,552,919 B1
(45) Date of Patent: Apr. 22, 2003

(54) CONVERTER UTILIZING PULSE DURATION MODULATION AND RIPPLE CONTROL

(76) Inventor: Douglas A. Bors, 10017 NE. 23rd St., Bellevue, WA (US) 98004

( * ) Notice: Subject to any disclaimer, the term of this patent is extended or adjusted under 35 U.S.C. 154(b) by 0 days.

(21) Appl. No.: 09/952,566

(22) Filed: Sep. 10, 2001

(51) Int. Cl.[7] .................................................. H02M 1/12
(52) U.S. Cl. ............................ 363/42; 307/105; 700/73
(58) Field of Search ........................... 700/73; 323/283, 323/284; 363/15, 41, 42, 45, 46; 307/105

(56) References Cited

U.S. PATENT DOCUMENTS

| | | | |
|---|---|---|---|
| 4,238,690 A | 12/1980 | Clarke | 307/44 |
| 4,370,702 A * | 1/1983 | Shuey et al. | 363/42 |
| 4,429,269 A | 1/1984 | Brown | 323/301 |
| 4,536,700 A * | 8/1985 | Bello et al. | 323/222 |
| 4,581,692 A | 4/1986 | Nayberg et al. | 363/27 |
| 4,713,608 A | 12/1987 | Catiller et al. | 324/142 |
| 5,208,738 A | 5/1993 | Jain | 363/17 |
| 5,208,740 A | 5/1993 | Ehsani | 363/124 |
| 5,319,514 A | 6/1994 | Walsh et al. | 361/59 |
| 5,343,139 A | 8/1994 | Gyugyi et al. | 323/207 |
| 5,390,101 A | 2/1995 | Brown | 363/20 |
| 5,465,011 A | 11/1995 | Miller et al. | 307/64 |
| 5,471,378 A | 11/1995 | King | 363/46 |
| 5,508,904 A | 4/1996 | Hara | 363/21 |
| 5,548,206 A | 8/1996 | Soo | 323/284 |
| 5,558,071 A | 9/1996 | Ward et al. | 123/598 |
| 5,594,631 A | 1/1997 | Katoozi et al. | 363/41 |
| 5,631,550 A | 5/1997 | Castro et al. | 323/283 |
| 5,654,881 A | 8/1997 | Albrecht et al. | 363/25 |
| 5,742,495 A | 4/1998 | Barone | 363/65 |
| 5,764,495 A * | 6/1998 | Faulk | 323/303 |
| 5,815,381 A * | 9/1998 | Newlin | 363/132 |
| 5,920,469 A | 7/1999 | Harvey | 363/56 |
| 5,942,880 A | 8/1999 | Akamatsu et al. | 323/210 |
| 5,982,156 A * | 11/1999 | Weimer et al. | 307/18 |
| 6,026,126 A * | 2/2000 | Gaetano | 375/296 |
| 6,212,079 B1 | 4/2001 | Balakrishnan et al. | 363/21 |
| 6,215,290 B1 | 4/2001 | Yang et al. | 323/282 |

OTHER PUBLICATIONS

Hui, S.Y.R., "Novel Random PWM Schemes with Weighted Switching Decision", *IEEE Transactions on Power Electronics, vol.* 12(6):945–951, Nov. 1997. pp. 945–951.
Unitrode Products from Texas Instruments "UCC2817, UCC2818, UCC3817, UCC3818 BiCMOS Power Factor Preregulator", *Texas Instruments, SLUS395 E,* Feb. 2000—Revised Apr. 2001, 18 pp.

* cited by examiner

*Primary Examiner*—Shawn Riley
(74) *Attorney, Agent, or Firm*—Seed IP Law Group PLLC

(57) ABSTRACT

A method for use in a power converter which includes: monitoring a magnitude of an input of a power-flow controller; generating a pulse-width modulated signal wherein at least one pulse has width correlated with a difference between a reference and the monitored magnitude; and varying an output power flow of the power-flow controller in response to the pulse-width modulated signal. In another embodiment of the method, the power converter is characterized by a power converter selected from the group including but not limited to a power supply, a power controller, and a power regulator. In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer.

30 Claims, 22 Drawing Sheets

CONVERTER UTILIZING PULSE DURATION MODULATION AND RIPPLE CONTROL

CROSS-REFERENCE(S) TO RELATED APPLICATION(S)

1. Field of the Invention

The present application relates to power converters, such as those utilized in modern data communications and data processing systems.

2. Background of the Invention

Most modern data processing and/or communication systems are created and designed using digital logic techniques. Digital logic is based on mathematical manipulation of two different symbols, such as logical zero ("0") and logical one ("1"). When digital logic design techniques are utilized, system designers employ a number of combinational or other type symbolic digital logic elements (e.g., drawings and associated logic tables of AND gates, OR gates, and/or microprocessors or other computational devices which operate on digital logic) in order to create "paper" or "symbolic" designs of data processing and/or data communication systems.

At some point, the digital logic system designers often attempt to implement their symbolic digital logic designs. One common way in which this is done is to implement the symbolic system via an electrical system which mimics the symbolic digital logic design, wherein digital logic zero ("0") is mimicked via a DC voltage signal having a relatively low voltage value (e.g., logical zero is mimicked via a DC voltage signal set at 0.2 volts) and digital logic one ("1") is mimicked via a DC voltage signal having a relatively high voltage value (e.g., logical zero is mimicked via a DC voltage signal set at 1 volt). Electrical systems which are used to mimic symbolic digital logic design are hereinafter referred to as "digital logic electrical systems."

As noted, digital logic electrical systems typically use DC power at relatively low voltage levels. However, those having ordinary skill in the art will recognize that readily available power is generally AC power of relatively high voltage (e.g., the 120 Volt, 60 Hertz AC power available from the North American power grid). Accordingly, in order for such power to be used with digital logic electrical systems, it is necessary to convert such relatively high-voltage AC power to the desired relatively low-voltage DC power. This is typically accomplished in the related art via what will be referred to herein as "power converters." (Although power converters are being introduced herein in the context of digital logic electrical systems for sake of illustration, those having ordinary skill in the art will appreciate that, as used herein, the term "power converter" is intended to refer to devices which convert electrical power from one form to another (e.g., devices which convert between AC and DC power (or vice versa), devices which convert between high-voltage DC power and low-voltage DC power (or vice versa), devices which convert between high-voltage AC power and low-voltage AC power (or vice versa), etc.))

When power converters are used to power digital logic electrical systems, it is critically important that the electrical signals produced by the power converters be held relatively constant. For example, in a digital logic electrical system where 0.2 volts is utilized to represent logical zero, and 1 volt is utilized to represent logical one, it can be seen that only a 0.8 volt potential difference exists between the electrical signals representative of logical zero and logical one. Accordingly, it is very important that the electrical signals representative of logical zero and logical one fluctuate as little as possible from their desired values.

Unfortunately, fluctuations in electrical signals—even DC electrical signals—are built into the very nature of electrical signals themselves, so in practice it has turned out to be surprisingly difficult to create stable electrical signals representative of logical zeroes and ones. It has been noted by system designers that one significant source of such fluctuations are DC power sources which are used to power digital logic electrical systems. That is, digital logic electrical systems are generally powered by some DC power source, and it has been long recognized that if the output voltage of a DC power source which powers a digital logic electrical system varies, or ripples, such variance or ripple tends to drag the electrical signals throughout the digital logic electrical system up and down, thereby introducing potential sources of digital logic errors into the system.

One way that the foregoing-noted source of error is often dealt with is to use power converters which begin with an extremely high-voltage DC power source wherein the variation, or ripple, in the DC output is tightly controlled (or regulated). Thereafter, the high voltage of the DC power source is successively divided downward, and such divided-down voltage is ultimately utilized to power a digital logic electrical system. Insofar as the DC voltage driving the electrical system is a divided-down version of the high-voltage DC power source, likewise the fluctuations in the DC voltage driving the electrical system are divided-down versions of the fluctuation of the voltage of the DC power source. Hence, provided that the fluctuation of the high-voltage DC power source has been held relatively constant, the DC power source driving the digital logic electrical system is generally extremely stable, which thereby allows the digital logic electrical system to operate in a substantially error free manner. One such type of power converter is known as a "switched mode power supply."

With reference to the figures, and with reference now to FIG. 1A, shown is a related-art switched mode power supply. Illustrated is that rectifier-filter section 102 receives as input a 120 volt AC power signal (e.g., from a wall socket), and transmits as output a rectified and smoothed version of the 120 volt AC power signal (e.g., a quasi-DC (or "ripply") version of the 120 volt signal, where the amount of ripple present depends upon the amount of the filtering used). Shown is that electrical "gating" or "chopping" device 104 receives as input the quasi-DC output of rectifier-filter section 102. Depicted is that chopping device 104 intermittently interrupts the received quasi-DC power signal in order to create a high-frequency time-varying (i.e., alternating current, or "AC") waveform version of the DC power signal as seen by the input of transformer 106 (e.g., chopping device 104 connecting the quasi-DC voltage to the input of transformer 106 for $\frac{1}{16000}$ of a second, then disconnecting the quasi-DC voltage from the input of transformer 106 for $\frac{1}{16000}$ second, then reconnecting the quasi-DC voltage to the input of transformer 106 for $\frac{1}{16000}$ of a second, etc., such that the input of transformer 106 experiences the output of chopping device 104 as essentially an 8000 Hertz (cycles per second) square wave having amplitude varying between 0 and the DC voltage that results from an AC-rectified signal). Illustrated is that transformer 106 accepts as input the created time-varying, or alternating current (AC), power signal and transmits as output a "stepped down," voltage version of its higher-frequency AC power input signal (transformer 106 is shown and described as what is known in the art as a "step-down" transformer).

Thereafter, illustrated is that rectifier-filter-regulator device 108 converts the higher-frequency AC power electrical output of the step-down transformer into circuit-voltage stable DC power (e.g., DC power at a stable 1 volt potential), such stable DC power being thereafter available to power digital logic electrical systems.

With reference now to FIG. 1B, shown is the related-art power converter of FIG. 1A, but with the addition of feedback circuitry. Depicted is that output-voltage monitor 112 receives a monitored voltage signal 114. In the related art, output-voltage monitor 112 generally transmits a "feedback" control signal 116 to rectifier-filter device 102, where control signal 116 is such that it controls the voltage level of the output of rectifier-filter device 102 such that the time-averaged DC voltage output of rectifier-filter-regulator device 108 is within predefined limits.

At this point, it is helpful to discuss at least one reason why the related art uses the foregoing described multi-stage scheme to achieve power conversion. One reason why the related art uses the foregoing scheme is that, from a practical standpoint, there is a relationship which indicates that the higher the frequency of a waveform applied to a transformer, the cheaper and more efficient a transformer can be made, because the magnetic components within a transformer will generally weigh less, require less material, or have less power loss at higher frequencies. Accordingly, by increasing the frequency of the waveform to be applied to a transformer, a system can use smaller, cheaper, and cooler-running transformers and/or inductors, which gives multiple increases across various efficiencies (e.g., electrical transfer efficiency, cooling efficiency, component life, etc.).

SUMMARY OF THE INVENTION

In one embodiment, a method for use in a power converter includes: monitoring a magnitude of an input of a power-flow controller; generating a pulse-width modulated signal wherein at least one pulse has width correlated with a difference between a reference and the monitored magnitude; and varying an output power flow of the power-flow controller in response to the pulse-width modulated signal.

In another embodiment of the method, the power converter is characterized by a power converter selected from the group including but not limited to a power supply, a power controller, and a power regulator.

In another embodiment of the method, generating a pulse-width modulated signal wherein at least one pulse has width correlated with a difference between a reference and the monitored magnitude is characterized by: adjusting a pulse width in response to a time during which a reference saw-tooth waveform magnitude substantially exceeds the monitored magnitude.

In another embodiment of the method, adjusting a pulse width in response to a time during which a reference saw-tooth waveform magnitude substantially exceeds the monitored magnitude is characterized by: triggering a leading edge of a pulse in response to the reference saw-tooth waveform magnitude substantially exceeding the monitored magnitude and triggering a trailing edge of the pulse in response to the reference saw-tooth waveform magnitude equaling or falling below the monitored magnitude.

In another embodiment of the method, adjusting a pulse width in response to a time during which a reference saw-tooth waveform magnitude substantially exceeds the monitored magnitude is characterized by: summing a saw-tooth waveform with a DC offset to achieve the reference saw-tooth waveform magnitude.

In another embodiment of the method, summing a saw-tooth waveform with a DC offset to achieve the reference saw-tooth waveform magnitude is characterized by: adjusting the DC offset in response to an average output voltage level of the power-flow controller.

In another embodiment of the method, the summing a saw-tooth waveform with a DC offset to achieve the reference saw-tooth waveform magnitude is characterized by: adjusting the saw-tooth waveform amplitude in response to at least one variation in an output voltage magnitude of the power-flow controller.

In another embodiment of the method, varying an output power flow of the power-flow controller in response to the pulse-width modulated signal is characterized by: gating a power flow control device selected from the group including but not limited to a power transistor, a field effect transistor (e.g., a FET or MOSFET), and an insulated-gate, bipolar transistor (IGBT) where the gating is such that energy transfer is more restricted when the input voltage magnitude is larger relative to a threshold and is less restricted when the input voltage magnitude is smaller relative to the threshold.

In another embodiment of the method, gating a power flow control device is characterized by: gating the power flow control device interposed between an input of the power flow controller and an input of a transformer internal to the power-flow controller.

In another embodiment of the method, gating the power flow control device interposed between an input of the power flow controller and an input of a transformer internal to the power-flow controller is characterized by: gating the power flow control device interposed between an input of the power flow controller and an input of a step-down transformer internal to the power-flow controller.

In another embodiment of the method, gating the power flow control device interposed between an input of the power flow controller and an input of a transformer internal to the power-flow controller is characterized by: gating the power flow control device interposed between an input of the power flow controller and an input of a step-up transformer internal to the power-flow controller.

In another embodiment of the method, generating a pulse-width modulated signal wherein at least one pulse has width correlated with a difference between a reference and the monitored magnitude is characterized by: adjusting a pulse width in response to a digital signal processor calculation based on a digitized value representing the monitored magnitude.

In another embodiment of the method, generating a pulse-width modulated signal wherein at least one pulse has width correlated with a difference between a reference and the monitored magnitude is characterized by: adjusting a pulse width in response to a digital signal processor calculation based on both a digitized value representing the monitored magnitude and a digitized value representing a magnitude of an output of the power controller in order to regulate an average output voltage magnitude.

In another embodiment of the method, generating a pulse-width modulated signal wherein at least one pulse has width correlated with a difference between a reference and the monitored magnitude is characterized by: adjusting a pulse width in response to a digital signal processor calculation based on both a digitized value representing the monitored magnitude and a digitized value representing a magnitude of an output of the power controller in order to control the quality of output regulation (e.g., to reduce short-term variations in the magnitude of the output voltage).

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer.

In one embodiment, a power converter includes but is not limited to a forward-looking control device.

In another embodiment of the power converter, the power converter is characterized by the power converter selected from a power-converter group including but not limited to a power supply, a power controller, and a power regulator.

In another embodiment of the power converter, the power converter is characterized by the forward-looking control device operably coupled to a quasi-DC power input of a power controller.

In another embodiment of the power converter the power converter is characterized by the forward-looking control device operably coupled to an output of the power converter.

In another embodiment of the power converter, the forward-looking control device is characterized by a pulse-width control circuit.

In another embodiment of the power converter, the pulse-width control circuit is characterized by a comparator circuit; and a reference voltage circuit.

In another embodiment of the power converter, the forward-looking control device is characterized by an average power-converter-output-voltage control circuit.

In another embodiment of the power converter, the average power-converter-output-voltage control circuit is characterized by a reference amplifier and filter circuit; an offset adjust circuit; and a reference voltage circuit.

In another embodiment of the power converter, the forward-looking control device is characterized by a power-converter-output-voltage ripple control circuit.

In another embodiment of the power converter, the power-converter-output-voltage ripple control circuit is characterized by a ripple detector circuit; a voltage controlled amplifier circuit; and a reference voltage circuit.

The foregoing is a summary and thus contains, by necessity; simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1A:
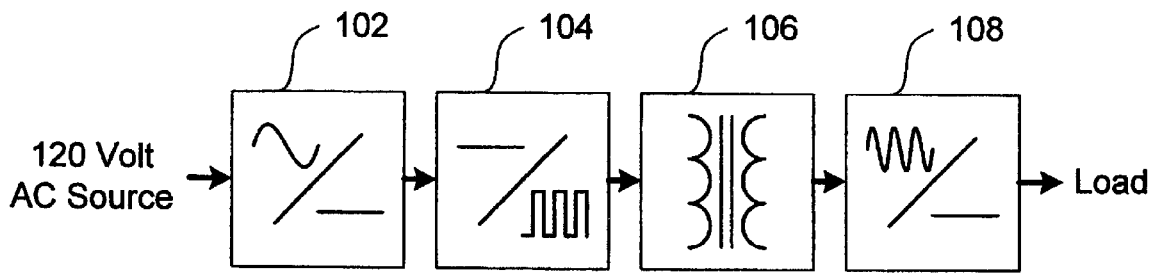
FIG. 1A shows a related-art switched mode power supply.

Irrespective of the undeniable benefits of the related art, the inventor has discovered that several problems exist in the related-art scheme. One such problem which the inventor has discovered is that the way in which rectifier-filter device 102 converts the AC power input to the quasi-DC power creates multiple levels of inefficiencies. The inventor has become aware that ripple of the quasi-DC output of rectifier-filter device 102 will tend to feed all the way through to the circuit voltage output of rectifier-filter-regulator device 108, and that, consequently the related-art designs require a trade-off. That is, the inventor has become aware that, despite the best efforts of electrical engineers and physicists, smoothing of the rectified AC signal by the filter aspect of rectifier-filter device 102 involves a trade-off between circuit efficiency and reduction of ripple sufficient such that the ultimate creation of the circuit voltage output of rectifier-filter-regulator device 108 is not unduly burdensome; that is, the inventor has become aware that while related-art passive filters used in devices such as rectifier-filter device 102 do function well in that they decrease the ripple of the quasi-DC power output of rectifier-filter device 102, such filters also cause what can be viewed as significant energy loss via the various frequency components which such filters reject (e.g., the inventor has determined that while the related-art techniques do function well, they are also less efficient than they could or should be in terms of power transfer). In addition, the inventor has also become aware that the way in which related-art rectifier-filter device 102 creates its quasi-DC power output gives rise to harmonic current components which feed back into the power distribution system itself (e.g., the power distribution system producing the 120 volt AC waveform in the above example) which the inventor has determined also reduce overall efficiency.

The inventor has likewise become aware that the common technique within the art of using passive and active circuit electrical engineering techniques (passive circuits use the power of the signal they are operating on to achieve a desired effect; active circuits require power beyond that of the signal they are acting on to achieve a desired effect, such as active regulators) to rectify and smooth the AC power output signal of transformer 106 such that a regulated version thereof can be used to produce the circuit-voltage DC power output of rectifier-filter-regulator device 108 is also less efficient than it could/should be due to the fact that rectifier-filter-regulator device 108 must reject/control the ripple fed through the system, which essentially means some energy is lost or consumed at rectifier-filter-regulator device in order to provide stability.

In sum, the inventor has recognized that the foregoing-described related-art schemes for producing a circuit-voltage low-ripple DC power supply are inefficient and expensive. In contrast to the teachings of the related art, which focus on multiple stages of filtering and regulation, including heavily filtering the first stage rectifier output (i.e., the filtering of the rectifier aspect of rectifier-filter device 102) and regulating the rectified and smoothed version of the output of transformer 106, the inventor has devised a method and system which attempts to control, at least in part, the ultimate ripple of the rectified and smoothed version (e.g., the circuit-voltage output of rectifier-filter-regulator device 108) of the output of transformer 106 by controlling the way in which a first-stage power signal (e.g., the 120 volt AC signal) is gated, or chopped. In the inventor's methods and systems, the gating of a first-stage power signal is done in such a way that the amount of filtering necessary to create the first-stage power signal is significantly reduced and such that the output of the rectified and smoothed version of the output of transformer 106 is stable enough such that further regulation of such voltage is of an extent far less than that required in the related art.

Figure 1B:
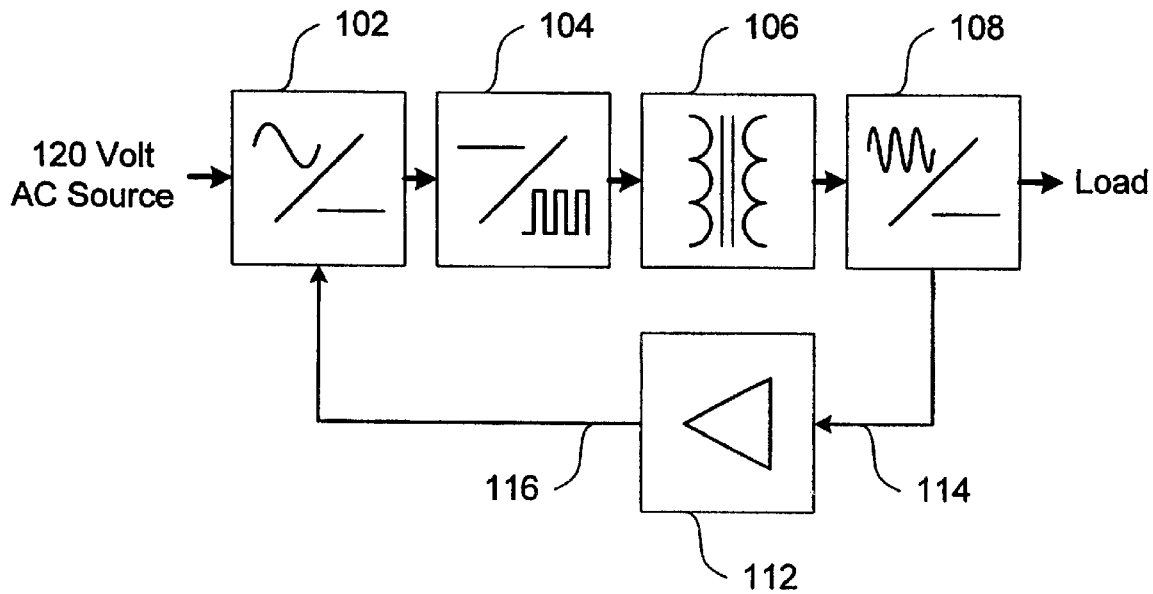
FIG. 1B shows the related-art power converter of FIG. 1A, but with the addition of feedback circuitry.
Figure 1C:
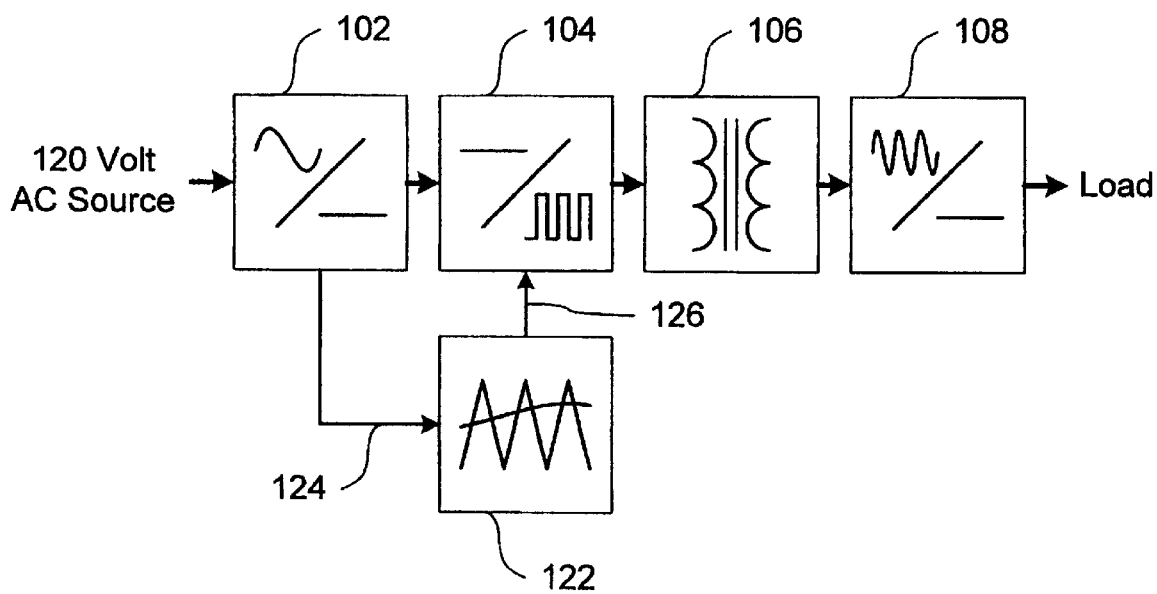
FIG. 1C shows a high-level block diagram of a system and method deployed in an environment formed by the related art system of FIG. 1A.

With reference now to FIG. 1C, shown is a high-level block diagram of a system and method deployed in an environment formed by the related art system of FIG. 1A. Illustrated is that forward-looking control device 122 (the term "forward-looking" is used to emphasize a significant difference of the present scheme from the related art; that is, whereas the related art enacts control based on a fed back version of the output signal (see, e.g., FIG. 1B), the present scheme enacts control based at least in part on a fed forward version of the input signal) receives quasi-DC voltage signal 124.

Pictographically depicted internal to forward-looking control device 122 is that quasi-DC voltage signal 124 is compared against a reference saw-tooth waveform voltage. As was noted above, the rectified voltage output of rectifier-filter device 102 is quasi-DC, which means that rectified-filtered voltage signal 124 will vary somewhat over time, rather than just staying at some stable DC voltage. Accordingly, shown internal to forward-looking control device 122 is that rectified-filtered voltage signal 124 is somewhat time varying.

Shown is that forward-looking control device 122 transmits control signal 126 to chopping device 104. Control signal 126 is such that when the reference saw-tooth waveform exceeds the magnitude of rectified-filtered voltage signal 124, chopping device 104 starts a pulse (i.e., connects the output of rectifier-filter device 102 to the input of transformer 106) and when the reference saw-tooth waveform falls below the magnitude of rectified-filtered voltage signal 124, chopping device 104 ends the pulse (i.e., disconnects the output of rectifier-filter device 102 from the input of transformer 106). It has been found by the inventor that the use of this scheme creates an appreciable reduction in the system-wide filtering necessary to give a stable DC output (e.g., the output of rectifier-filter-regulator device 108).

Figure 1D:
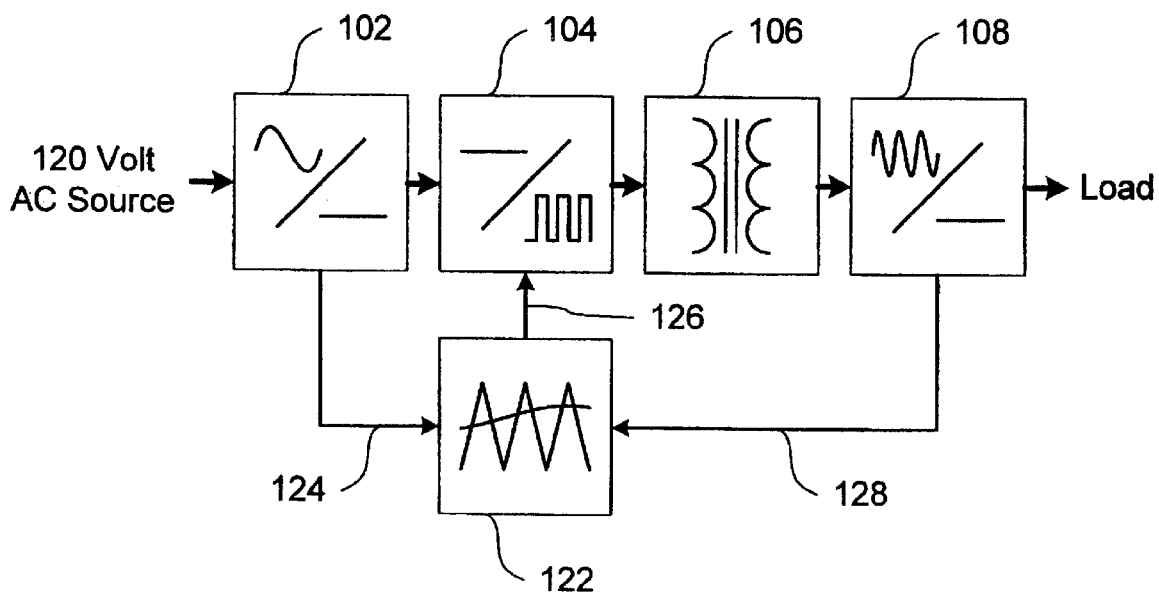
FIG. 1D shows an alternate embodiment of the system and method of FIG. 1C.

Referring now to FIG. 1D, shown is an alternate embodiment of the system and method of FIG. 1C. Depicted is that forward-looking control device receives monitored output voltage signal 128, which in one embodiment is used to provide a DC offset to the reference saw-tooth voltage waveform such that the time-averaged voltage output to the load is within acceptable limits (see, e.g., FIGS. 2B and 4B and their respective discussions), and which in another embodiment is used to scale the magnitude of the reference saw-tooth waveform such that the ripple of the ultimate output of the system is kept within acceptable limits (see, e.g., FIGS. 2C and 4C and their respective discussions).

Figure 1E:
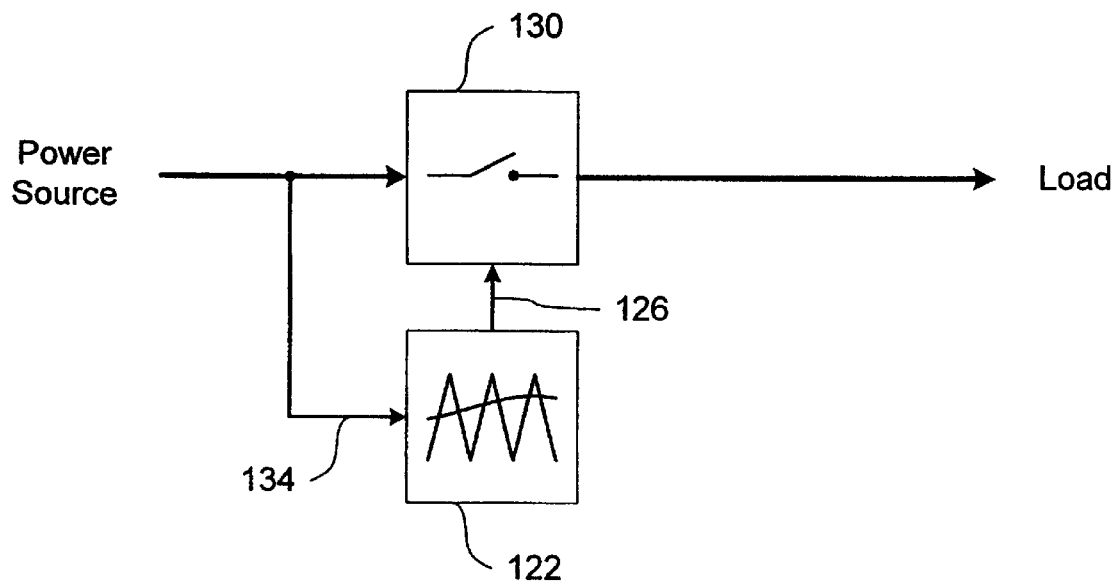
FIGS. 1E and 1F show that the methods and systems described in relation to FIGS. 1C and 1D can be utilized within power converters which use a chopping device 130 (illustrated as a switch in FIG. 1E and 1F) to directly or indirectly convert an input power form to an output power form appropriate to a load.
Figure 1F:
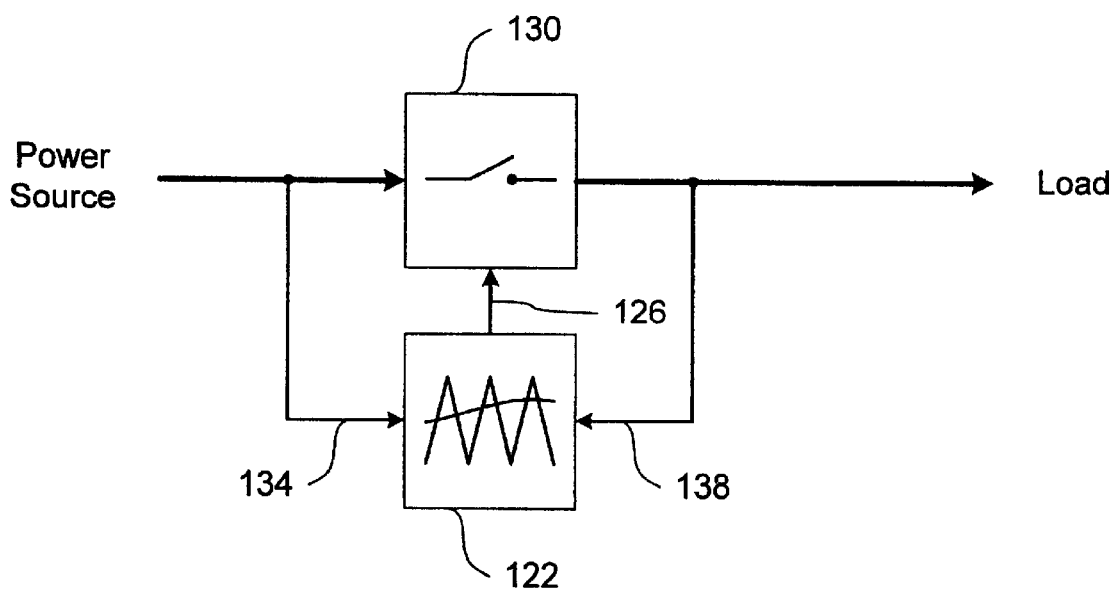

As noted above, although switched mode power supply oriented block diagrams are being utilized herein for sake of illustration, the applicability of the methods and systems described herein are not limited to switched-mode power supplies, but rather may be used with a wide variety of power converters. Accordingly, illustrated in FIGS. 1E and 1F is that the methods and systems described in relation to FIGS. 1C and 1D can be utilized within power converters which use a chopping device 130 (illustrated as a switch in FIG. 1E and 1F) to directly or indirectly convert an input power form to an output power form appropriate to a load. Depicted in FIGS. 1E and 1F, respectively, are that forward-looking control device can function by use of rectified-filtered voltage signal 134, or can function by use of the addition of monitored output voltage signal 138. One example of a power converter where the scheme would prove helpful would be a DC to DC power converter where a DC source, connected in series with an inductor connected in series with a capacitor, is "chopped," or switched, in such a fashion that a DC voltage of some desired magnitude appears on the capacitor. Those skilled in the art will recognize that the foregoing example is merely exemplary and not exhaustive.

Those having ordinary skill in the art will appreciate that the devices illustrated and described in relation to FIGS. 1E and 1F are exemplary of the fact that the description of schemes herein can be utilized with devices other than switched mode power supplies. However, those skilled in art will recognize that the devices of FIGS. 1E and 1F, in some versions, may contain one or more components used in switched mode power supplies.

Figure 2A:
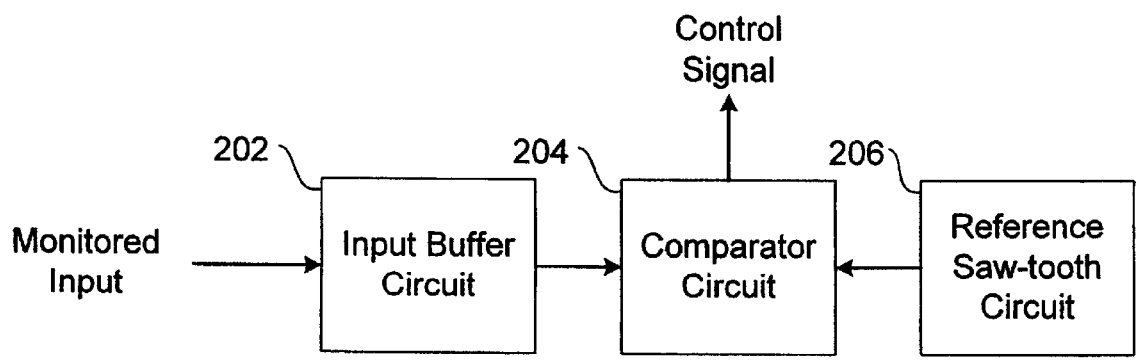
FIG. 2A shows a high-level block diagram of an embodiment of forward-looking control device 122 of FIG. 1C.

With reference now to FIG. 2A, shown is a high-level block diagram of an embodiment of forward-looking control device 122 of FIG. 1C. Depicted is input buffer circuit 202 receiving the "monitored input" voltage of a power converter (e.g., rectified-filtered voltage 124 or 134 of FIGS. 1C–D and 1E–F, respectively) and thereafter transmitting the buffered input voltage to comparator circuit 204. Illustrated is reference saw-tooth waveform generation circuit 206 transmitting a reference saw-tooth waveform voltage to comparator circuit 204. Shown is that comparator circuit 204 transmits a control signal (e.g., control signal 126 of FIGS. 1C–D and 1E–F, respectively) which transitions to a higher voltage (e.g., goes high) when the received reference saw-tooth waveform voltage exceeds the buffered input voltage and which transitions to a lower voltage (e.g., goes low) when the received reference saw-tooth waveform voltage falls below the buffered input voltage.

Figure 2B:
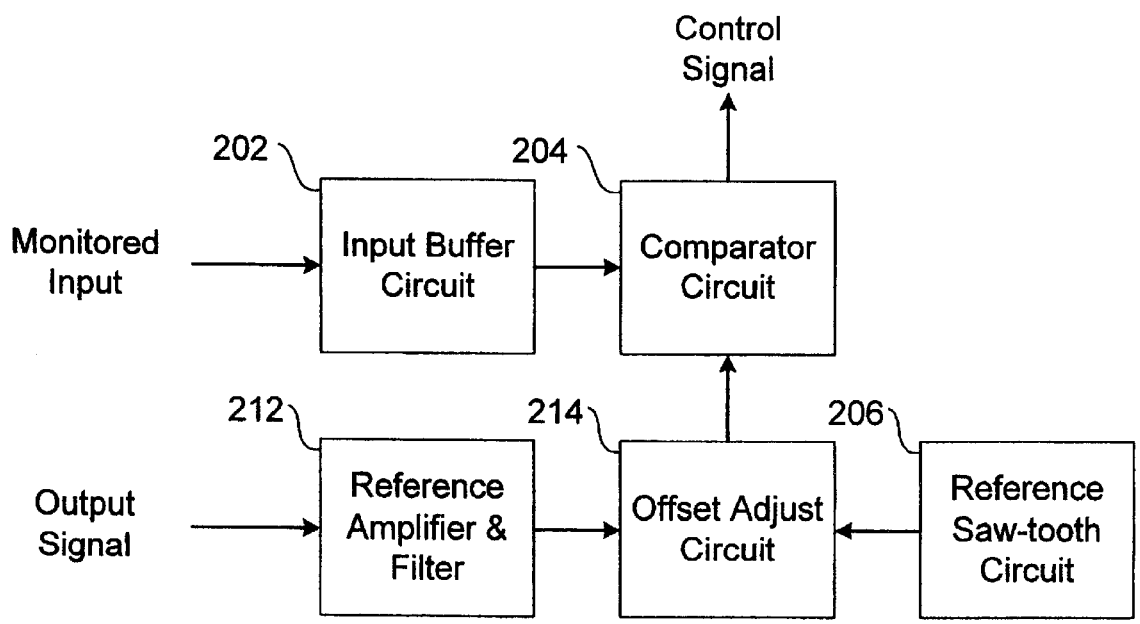
FIG. 2B shows the high-level block diagram of FIG. 2A modified to achieve an embodiment of forward-looking control device 122 of FIG. 1D.

With reference now to FIG. 2B, shown is the high-level block diagram of FIG. 2A modified to achieve an embodiment of forward-looking control device 122 of FIG. 1D. Depicted is reference amplifier and filter circuit 212 receiving the "monitored output signal" of a power converter (e.g., the output voltage of rectifier-filter-regulator device 108, or the monitored output voltage signal 128 or 138, of FIGS. 1C–D and 1E–F, respectively) and transmitting a resultant amplified and filtered version of the monitored output signal to offset adjust circuitry 214.

Illustrated is that, in one embodiment, offset adjust circuit 214 adds a DC offset signal voltage to the reference saw-tooth waveform voltage produced by reference saw-tooth waveform circuit 206, and thereafter feeds the composite DC offset-reference saw-tooth waveform voltage to comparator circuit 204. As shown and described following in relation to FIG. 4B, increasing/decreasing the DC offset of the reference saw-tooth waveform will increase/decrease the duration of pulses produced by comparator circuit 204, while maintaining the proportionality between the duration of any two pulses. Those skilled in art will appreciate that the result of the foregoing is that the time-averaged output voltage of rectifier-filter-regulator device 108 will increase/decrease proportionally. The remaining block diagram components of FIG. 2B function substantially as described previously.

Figure 2C:
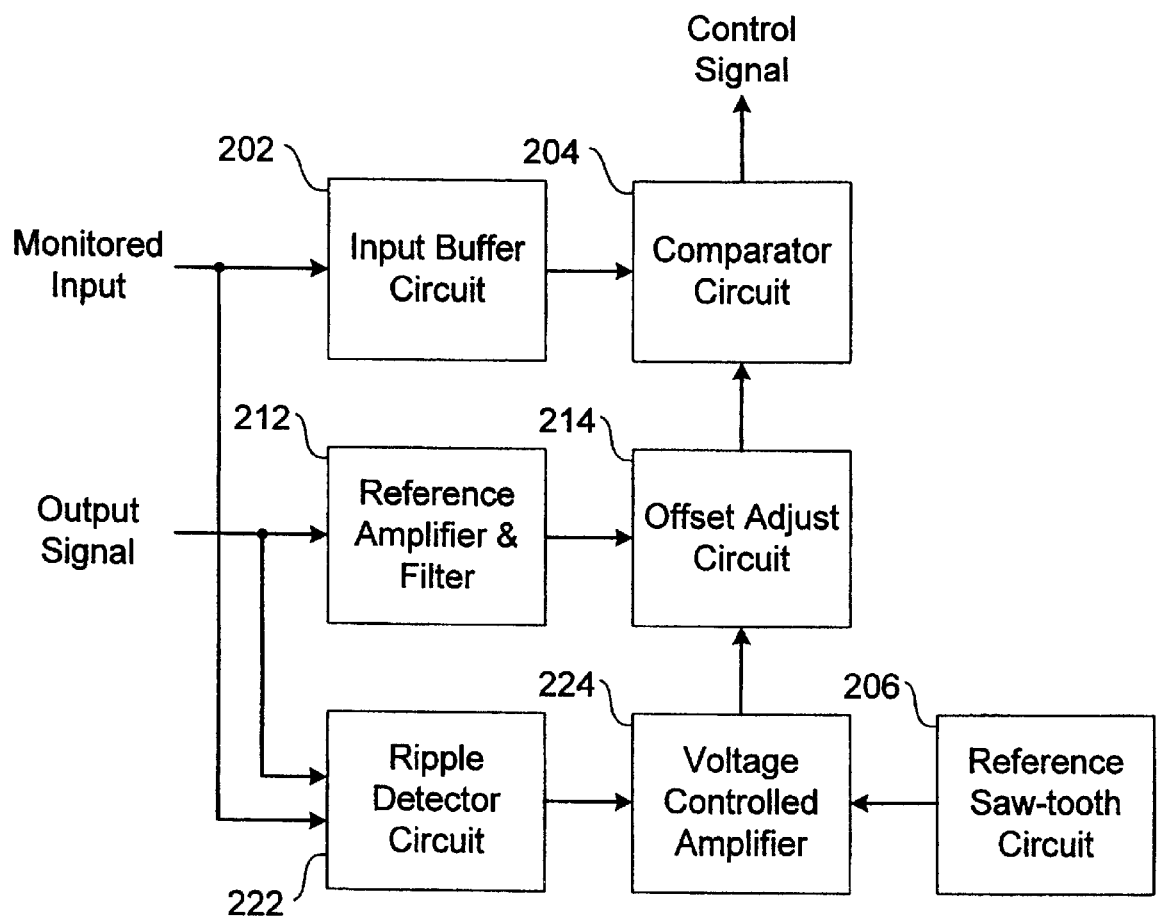
FIG. 2C shows the high-level block diagram of FIG. 2B modified to achieve an embodiment of forward-looking control device 122 of FIG. 1D.

With reference now to FIG. 2C, shown is the high-level block diagram of FIG. 2B modified to achieve an embodiment of forward-looking control device 122 of FIG. 1D. Depicted is ripple-detector circuit 222 receiving both the "monitored output signal" voltage of a power converter (e.g., the output voltage of rectifier-filter-regulator device 108 of FIG. 1D or the monitored output voltage signal 138 of FIG. F) and the monitored input signal of the power converter (e.g., rectified-filtered voltage 124 or 134 of FIGS. 1D and 1F, respectively).

Ripple detector circuit 222 functions such that if there is significant ripple in the monitored output signal, and such ripple is substantially in phase with detected ripple of the monitored input signal of the power converter, ripple detector circuit 222 "assumes" that the detected ripple of the monitored output signal arises from "undercontrol" (since the ripple of the output is effectively tracking the ripple of the input); and, hence, in such cases of assumed undercontrol ripple detector 222 functions to decrease the gain of voltage controlled amplifier 224, which (as can be seen following in relation to FIG. 4C), will result the output voltage pulses of comparator circuit 204 having less similar durations, which those skilled in the art will appreciate will tend to decrease the ripple at the output.

Ripple detector circuit 222 also functions such that if there is significant ripple in the monitored output signal, and such ripple is substantially out of phase with detected ripple of the monitored input signal of the power converter, ripple detector circuit 222 "assumes" that the detected ripple of the monitored output signal arises from "overcontrol" (since the ripple of the output is effectively reversing the ripple of the input by some amount); and, hence, in such cases of assumed overcontrol ripple detector 222 functions to increase the gain of voltage controlled amplifier 224, which (as can be seen following in relation to FIG. 4C), will result the output voltage pulses of comparator circuit 204 having more similar durations, which those skilled in the art will appreciate will tend to decrease the ripple at the output.

Figure 4A:
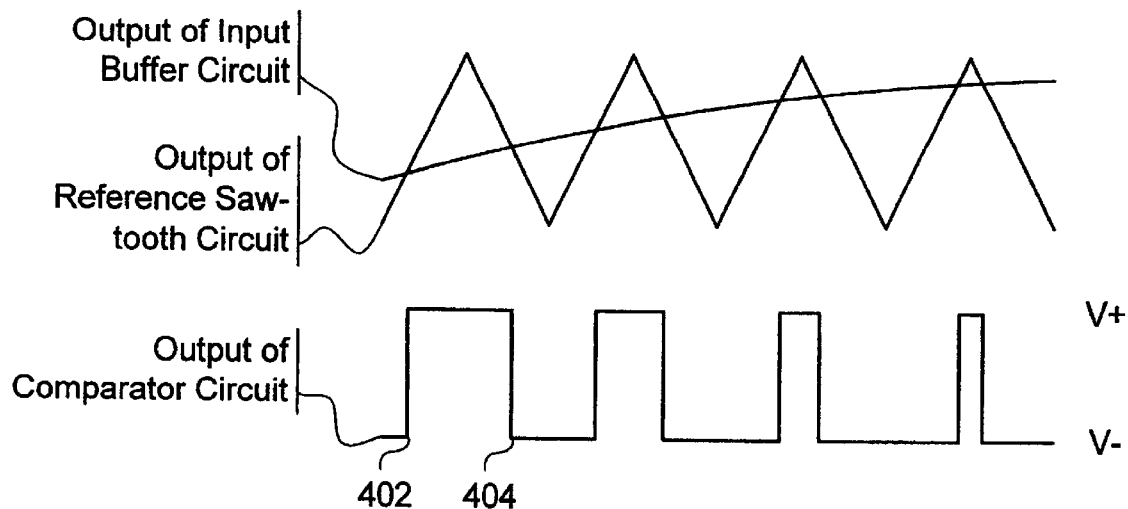
FIG. 4A shows a pictographic representation of aspects of the scheme used and described in relation to FIGS. 1C, 1E, and 2A.

In one embodiment, the embodiment of FIG. 2C is made more stable by ensuring that the functions performed by the system ripple detector circuit 222, voltage controlled amplifier circuit 224, and reference saw-tooth circuit 206 (see, e.g., FIG. 4C and its accompanying discussion) are performed relatively more slowly than the functions performed by reference amplifier and filter 212 and offset adjust circuit 214 (see, e.g., FIG. 4B and its accompanying discussion), and ensuring that the functions performed by reference amplifier and filter 212 and offset adjust circuit 214 are themselves performed relatively more slowly than the functions performed by input buffer circuit 202 and comparator circuit 204 (see, e.g., FIG. 4A and its accompanying text).

Figure 3:
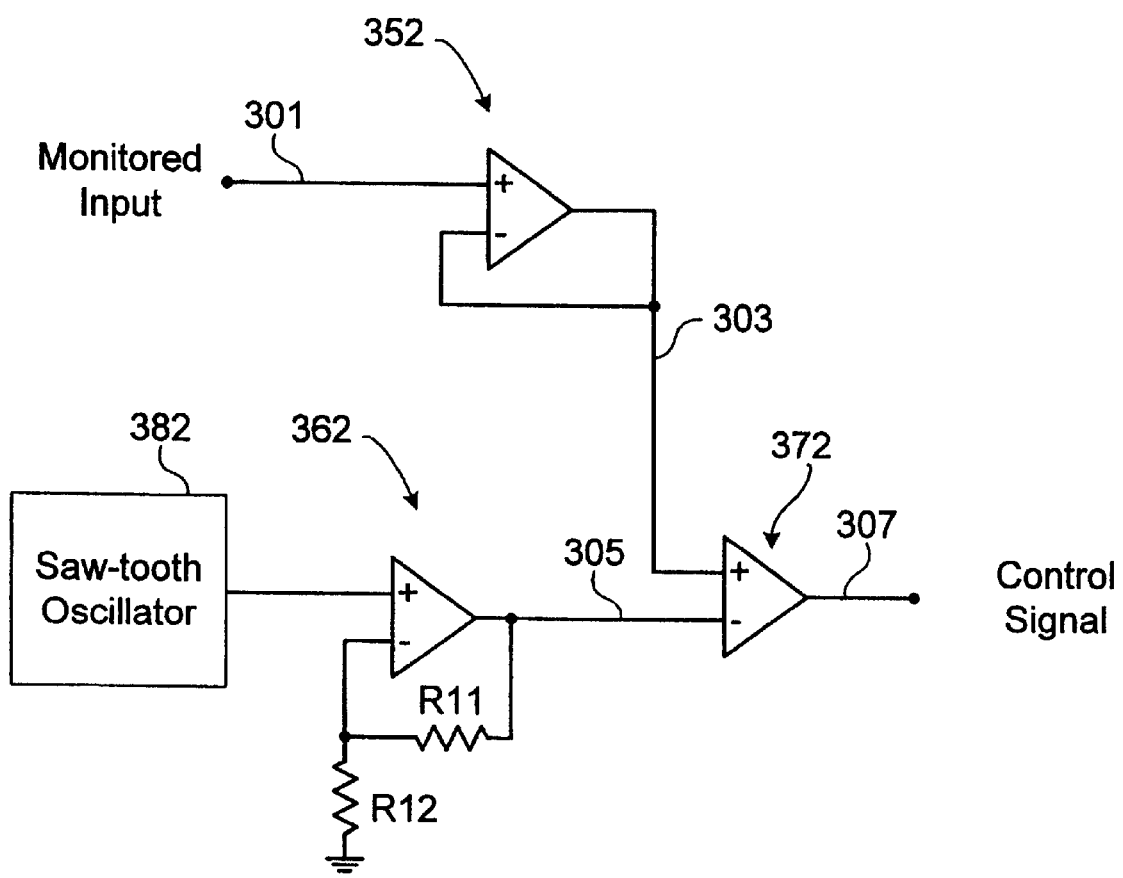
FIG. 3 shows a schematic diagram of an embodiment of forward-looking control device 122 of FIGS. 1C and 2A.

Referring now to FIG. 3, shown is a schematic diagram of an embodiment of forward-looking control device 122 of FIGS. 1C and 2A. Shown is that one embodiment of input buffer circuit 202 is achieved by amplifier 352. Depicted is that one embodiment of reference saw-tooth amplifier circuit 206 which is achieved via saw-tooth oscillator 382 feeding amplifier 362. Illustrated is that one embodiment of comparator circuit 204 which is achieved via comparator 372. Those having ordinary skill in the art will appreciate that it is more traditional to use operational amplifiers connected in inverting fashion. However, the operational amplifiers in FIG. 3 are shown in non-inverting configuration, because the non-inverting configuration is consistent with the schemes described herein. Conversion of the non-inverting circuitry, as shown, to more traditional converting circuitry is well within the skill of those having ordinary skill in the art in light of the disclosure herein.

The monitored input signal and control signal shown are substantially the same as depicted and described in relation to FIGS. 1C–F and 2A–C.

With reference now to FIG. 4A, shown is a pictographic representation of aspects of the scheme used and described in relation to FIGS. 1C, 1E, and 2A. Depicted is that when the voltage magnitude of the output of input buffer circuit 202 (which is substantially equivalent to the monitored input voltage of chopping device 104 or 130) is exceeded by the voltage magnitude of the output voltage of reference saw-tooth waveform circuit 206, the output voltage of comparator circuit 204 rises and creates leading-edge 402 of a pulse. Illustrated is that when the voltage magnitude of the output of input buffer circuit 202 (which is substantially equivalent to the monitored input voltage of a power controller) is greater than the voltage magnitude of the output of reference saw-tooth waveform circuit 206, the output of comparator circuit 204 falls and creates trailing-edge 404 of a pulse. Insofar as that the rise and fall of the output voltage of comparator circuit 204 creates a control signal (e.g., control signal 126 or 136) which controls control chopping device 104, for all intents and purposes the duration of the pulse created by the output voltage of comparator 204 will be roughly the same as the duration of the pulse created by chopping device 104 applying quasi-DC power to the input terminals of transformer 206. Accordingly, as shown in FIG. 4A, as the monitored input voltage starts to rise, the scheme ensures that the duration of the pulses applied to the input of transformer 206 become proportionally shorter, which those having ordinary skill in the art will appreciate will tend to hold the maximum induced output voltage of transformer 206 at a relatively stable position.

Figure 4B:
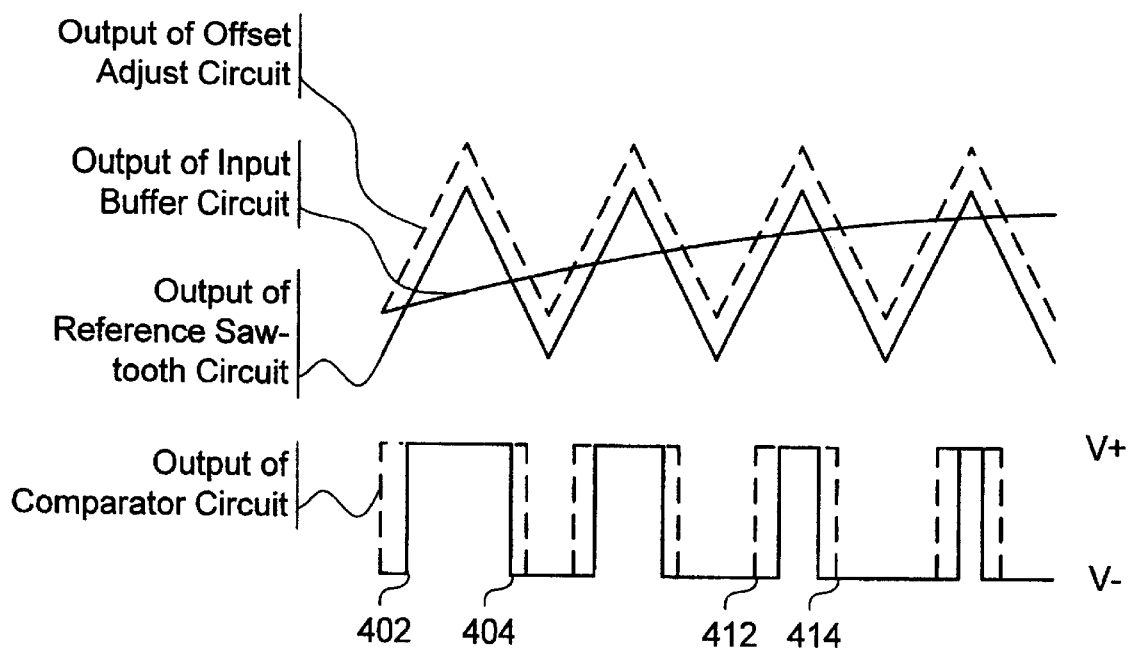
FIG. 4B shows a pictographic representation of the scheme used and described in relation to FIGS. 1D, 1F, and 2B and how such scheme varies in relation to the pictographic representation of FIG. 4A.

With reference now to FIG. 4B, shown is a pictographic representation of the scheme used and described in relation to FIGS. 1D, 1F, and 2B and how such scheme varies in relation to the pictographic representation of FIG. 4A. Depicted is that when the output of offset adjust circuit 214 causes the reference saw-tooth waveform voltage to shift upward by some amount, the output of comparator circuit 204 creates pulses (such created pulses appearing as dashed lines in FIG. 4B) that are proportionally wider than such pulses would be in the absence of the shift (such FIG. 4A pulses appearing as solid lines in FIG. 4B). Those having ordinary skill in the art will appreciate that shifting saw-tooth waveform downward would have substantially the opposite effect of that described.

Figure 4C:
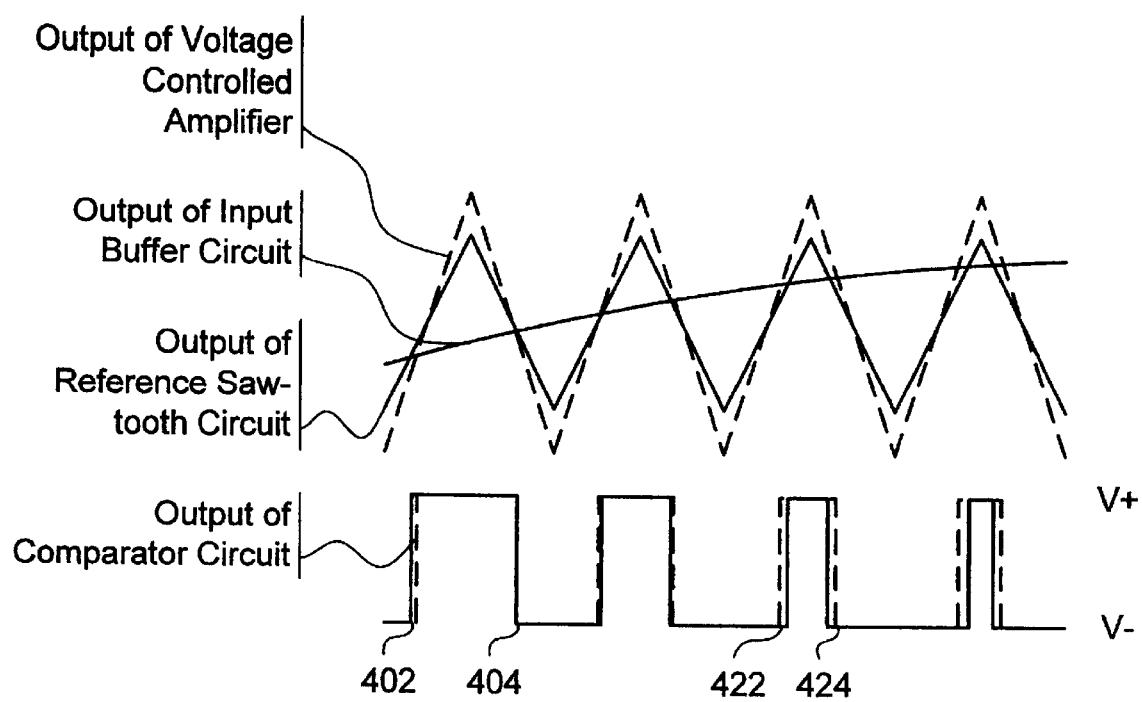
FIG. 4C shows a pictographic representation of the scheme used and described in relation to FIGS. 1D, 1F, and 2C and how such scheme varies in relation to the pictographic representation of FIG. 4A.

With reference now to FIG. 4C, shown is a pictographic representation of the scheme used and described in relation to FIGS. 1D, 1F, and 2C and how such scheme varies in relation to the pictographic representation of FIG. 4A. Depicted is that when the output of voltage controlled amplifier 224 is such that the peak-to-peak amplitude of reference saw-tooth waveform is increased by some amount, the output of comparator circuit 204 creates pulses (such created pulses appearing as dashed lines in FIG. 4C) which are more nearly uniform than such pulses would be in the absence of the increase in peak-to-peak amplitude (such FIG. 4A pulses appearing as solid lines in FIG. 4C). Notice that, unlike the case with the DC offset shown and discussed in relation to FIG. 4B, when the peak-to-peak amplitude of the reference saw-tooth waveform voltage is increased, the changes in the widths of the comparator outputs are not all proportional. Rather, as shown in FIG. 4C, those pulses which are already relatively near 50% in width change little while those pulses which are substantially greater or lesser than 50% in width change by a substantially greater amount. Consequently, the widths of the various pulses are brought into nearer conformance with each other, which those having ordinarily skill in the art will appreciate will tend to stabilize the ripple of rectifier-filter-regulator device 108, provided that neither undercontrol nor overcontrol occurs. Those having ordinary skill in the art will appreciate that decreasing the peak-to-peak voltage would have substantially the opposite effect of that described.

Figure 5:
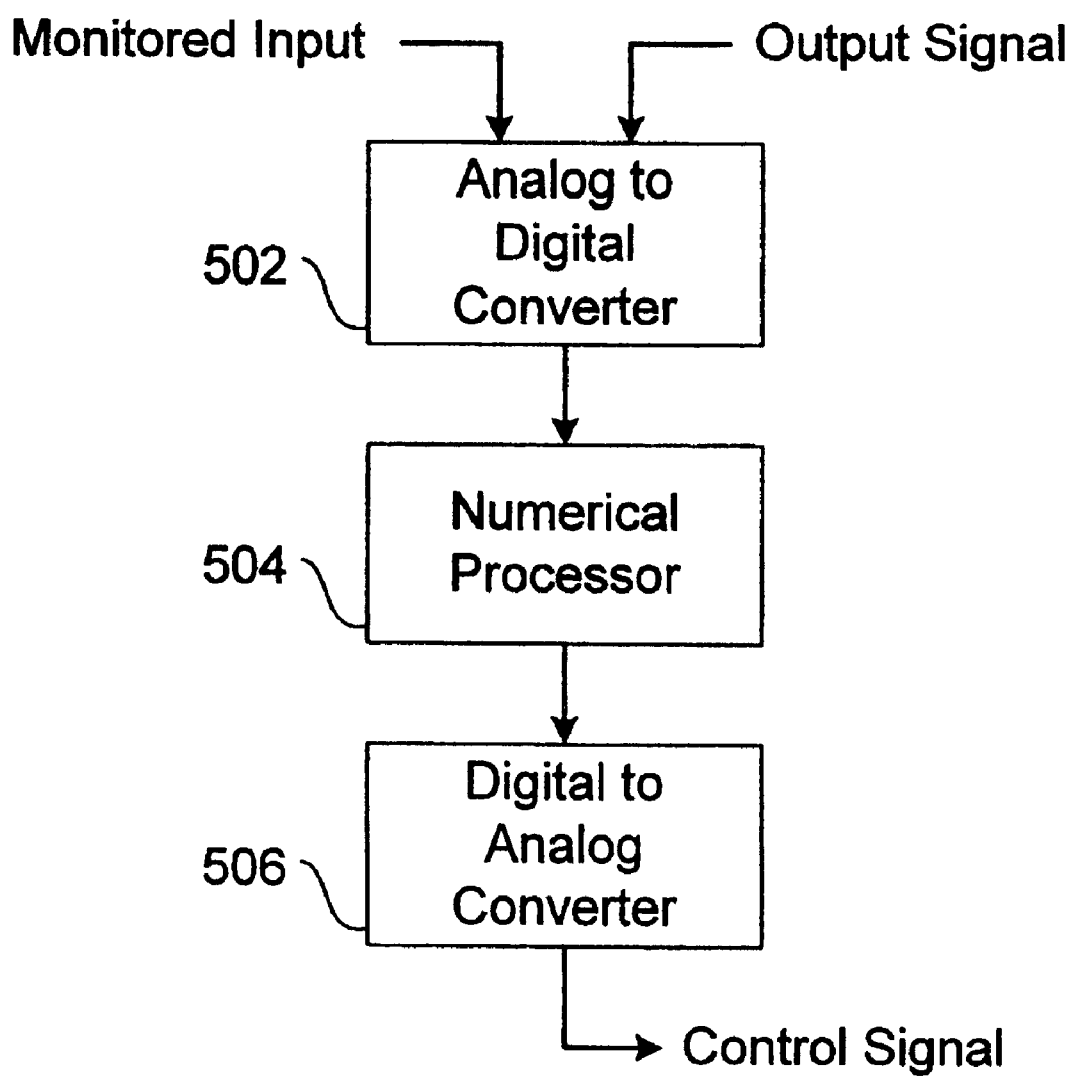
FIG. 5 depicts an environment that supports digital embodiments of methods and/or systems described herein.

Referring now to FIG. 5, depicted is an environment that supports digital embodiments of methods and/or systems described herein. Shown is that an analog to digital converter 502 converts the monitored input and monitored output signal voltages into digital representations of such monitored input and monitored output signals. Depicted is that the digitized monitored input and output signals are fed to numerical processor 504 (representative of a complete numerical processor having memory, CPU, and I/O components necessary to perform digital signal processing), which has one or more control programs running to perform the methods described herein. Those having ordinary skill in the art will recognize that the writing of such programs is well within the skill of one having ordinary skill in the art. Illustrated is that digital to analog converter 506 is used to convert the output of the numerical processor into an analog control signal.

Following are a series of flowcharts depicting embodiments of processes. For ease of understanding, the flowcharts are organized such that the initial flowcharts present embodiments via an overall "big picture" viewpoint and thereafter the following flowcharts present alternate embodiments and/or expansions of the "big picture" flowcharts as either sub-steps or additional steps building on one or more earlier-presented flowcharts. Those having ordinary skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process instances.

Figure 6:
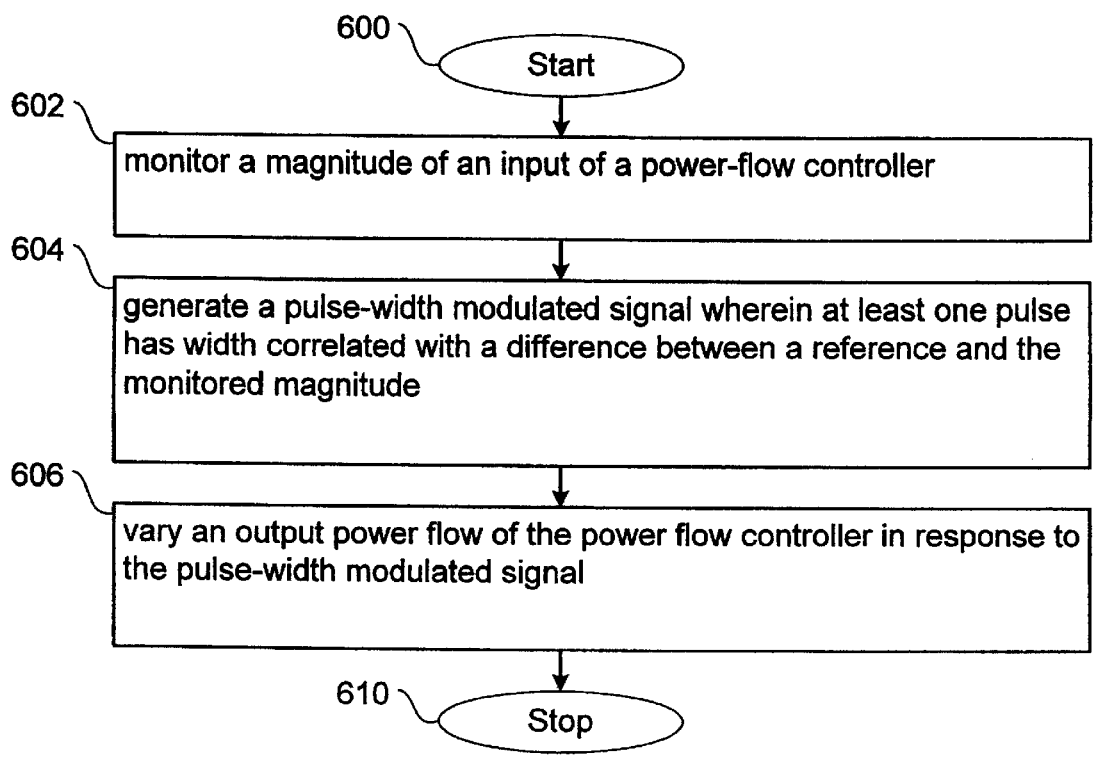
FIG. 6 shows a high-level logic flowchart depicting a process.

Referring now to FIG. 6, shown is a high-level logic flowchart depicting a process. Method step 600 shows the start of the process. Method step 602 depicts monitoring a magnitude of an input of a power-flow controller. Method step 604 shows generating a pulse-width modulated signal wherein at least one pulse has width correlated with a difference between a reference and the monitored magnitude. Method step 606 illustrates varying an output power flow of the power-flow controller in response to the pulse-width modulated signal. Method step 610 shows the end of the process. In various device embodiments, method steps 602, 604, and 606 are achieved via components shown and described in relation to FIGS. 1C–1F, and FIGS. 2A–2C. In various other device embodiments, method steps 602, 604, and 606 are achieved via one or more control programs running on a numerical processor interacting with associated circuitry such as were described in relation to FIG. 5. Yet still other device embodiments are described following.

Those having ordinary skill in the art will recognize that there are many different types of power converters, such as those illustrated by a power-converter group including but not limited to a power supply, a power controller, and a power regulator Those skilled in the art will recognize that the foregoing list is exemplary and not exhaustive.

Figure 7:
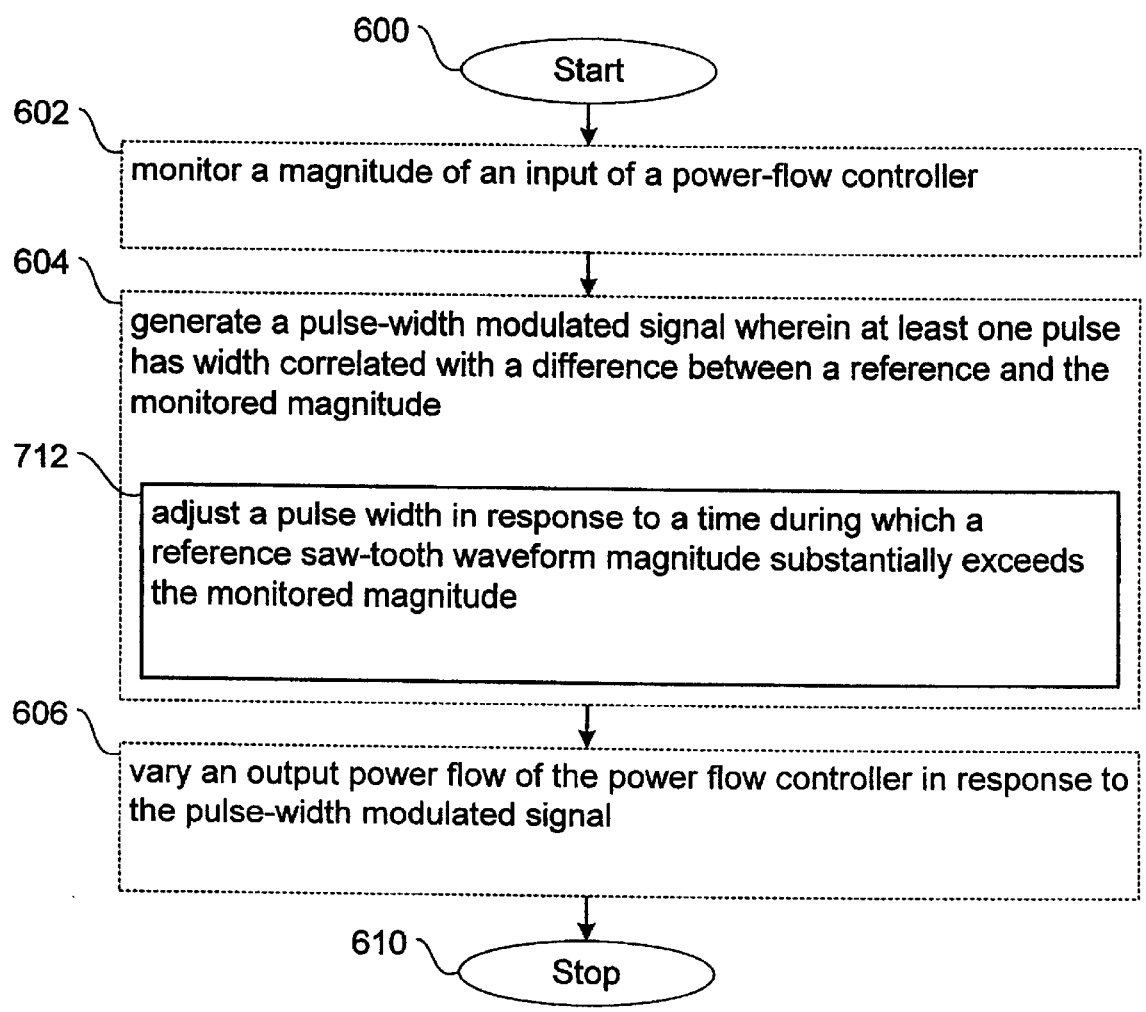
FIG. 7 shows a high-level logic flowchart depicting an alternate embodiment of the high-level logic flowchart of FIG. 6.

With reference now to FIG. 7, shown is a high-level logic flowchart depicting an alternate embodiment of the high-level logic flowchart of FIG. 6. Depicted is that in one embodiment method step 604 includes method sub-step 712. Illustrated is that, in one embodiment, generating a pulse-width modulated signal wherein at least one pulse has width correlated with a difference between a reference and the monitored magnitude can include, but is not limited to, adjusting a pulse width in response to a time during which a reference saw-tooth waveform magnitude substantially exceeds the monitored magnitude. In various device embodiments, method step 712 is achieved via components shown and described in relation to FIGS. 1C–1F, and FIGS. 2A–2C. In various other device embodiments, method step 712 is achieved via one or more control programs running on a numerical processor interacting with associated circuitry such as were described in relation to FIG. 5.

Figure 8:
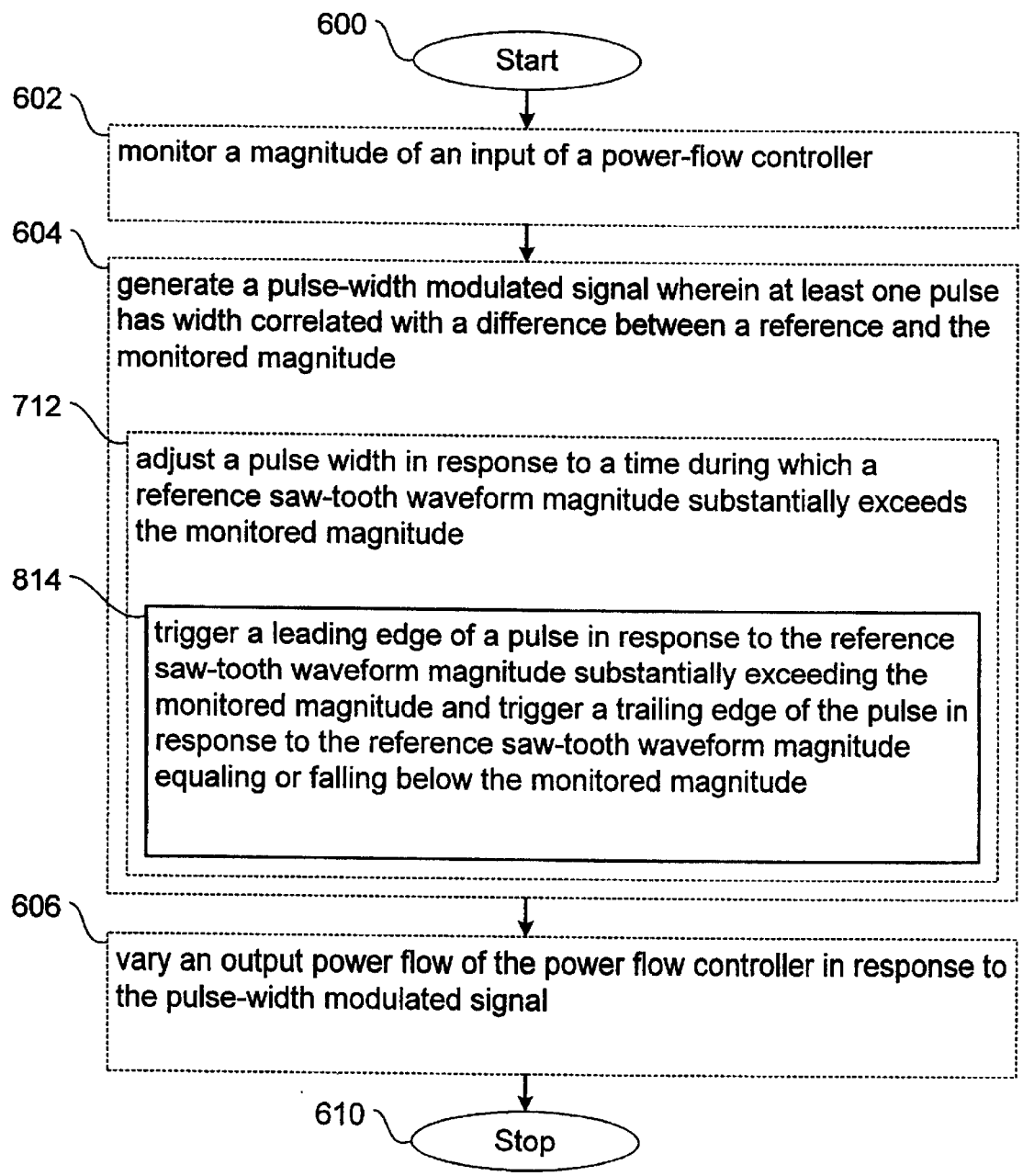
FIG. 8 shows a high-level logic flowchart depicting an alternate embodiment of the high-level logic flowchart of FIG. 7.

With reference now to FIG. 8, shown is a high-level logic flowchart depicting an alternate embodiment of the high-level logic flowchart of FIG. 7. Depicted is that in one embodiment method step 712 includes method sub-step 814. Illustrated is that, in one embodiment, adjusting a pulse width in response to a time during which a reference saw-tooth waveform magnitude substantially exceeds the monitored magnitude can include, but is not limited to, triggering a leading edge of a pulse in response to the reference saw-tooth waveform magnitude substantially exceeding the monitored magnitude and triggering a trailing edge of the pulse in response to the reference saw-tooth waveform magnitude equaling or falling below the monitored magnitude. In various device embodiments, method step 814 is achieved via components shown and described in relation to FIGS. 1C–1F, and FIGS. 2A–2C. In embodiments, method step 814 is achieved via one or more control programs running on a numerical processor interacting with associated circuitry such as were described in relation to FIG. 5.

Figure 9:
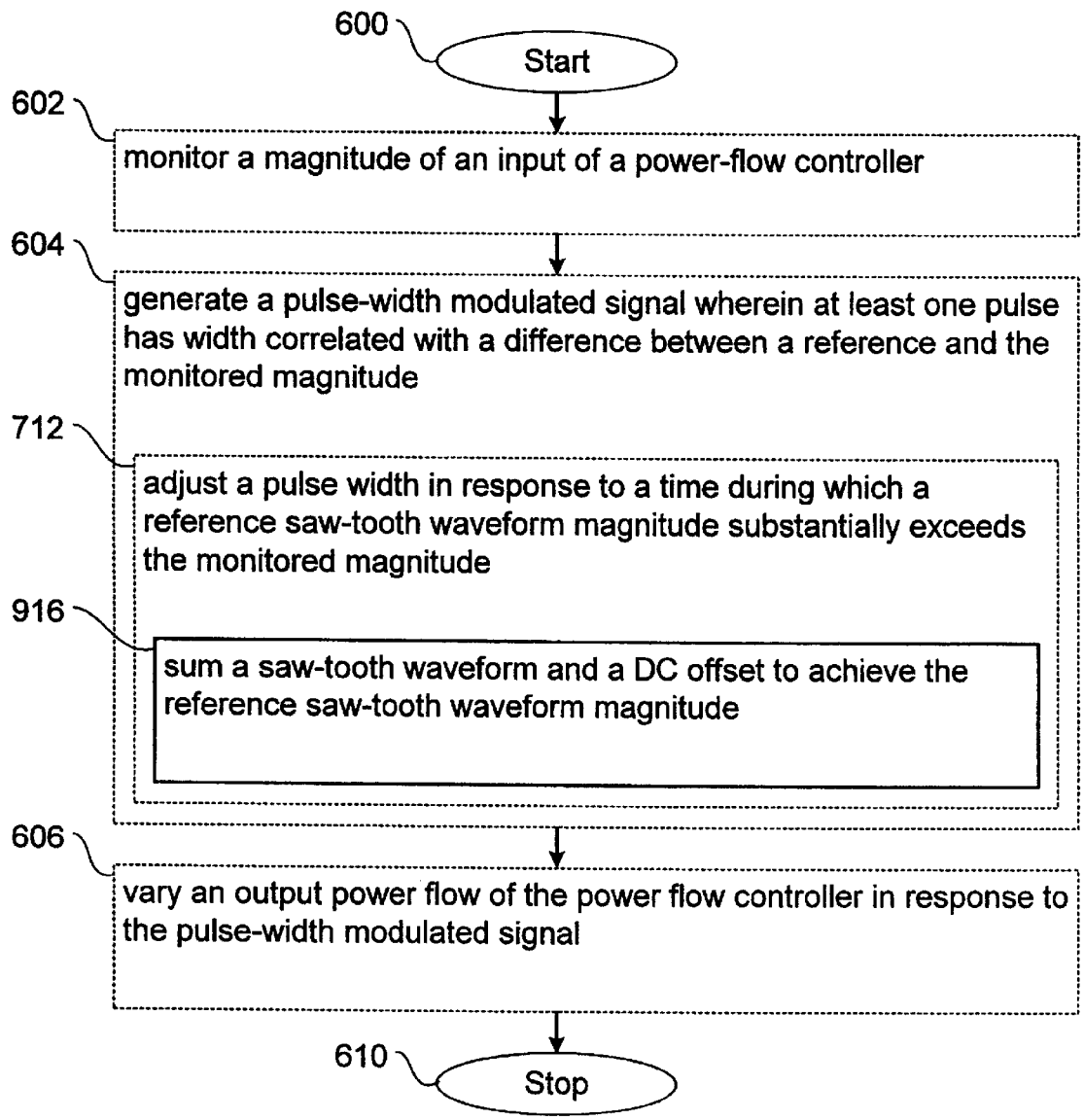
FIG. 9 shows a high-level logic flowchart depicting an alternate embodiment of the high-level logic flowchart of FIG. 7.

With reference now to FIG. 9, shown is a high-level logic flowchart depicting an alternate embodiment of the high-level logic flowchart of FIG. 7. Depicted is that in one embodiment method step 712 includes method sub-step 916. Illustrated is that, in one embodiment, adjusting a pulse width in response to a time during which a reference saw-tooth waveform magnitude substantially exceeds the monitored magnitude can include, but is not limited to, summing a saw-tooth waveform with a DC offset to achieve the reference saw-tooth waveform magnitude. In various device embodiments, method step 916 is achieved via components shown and described in relation to FIGS. 1D–1F, and FIGS. 2B–2C. In embodiments, method step 916 is achieved via one or more control programs running on a numerical processor interacting with associated circuitry such as were described in relation to FIG. 5.

Figure 10:
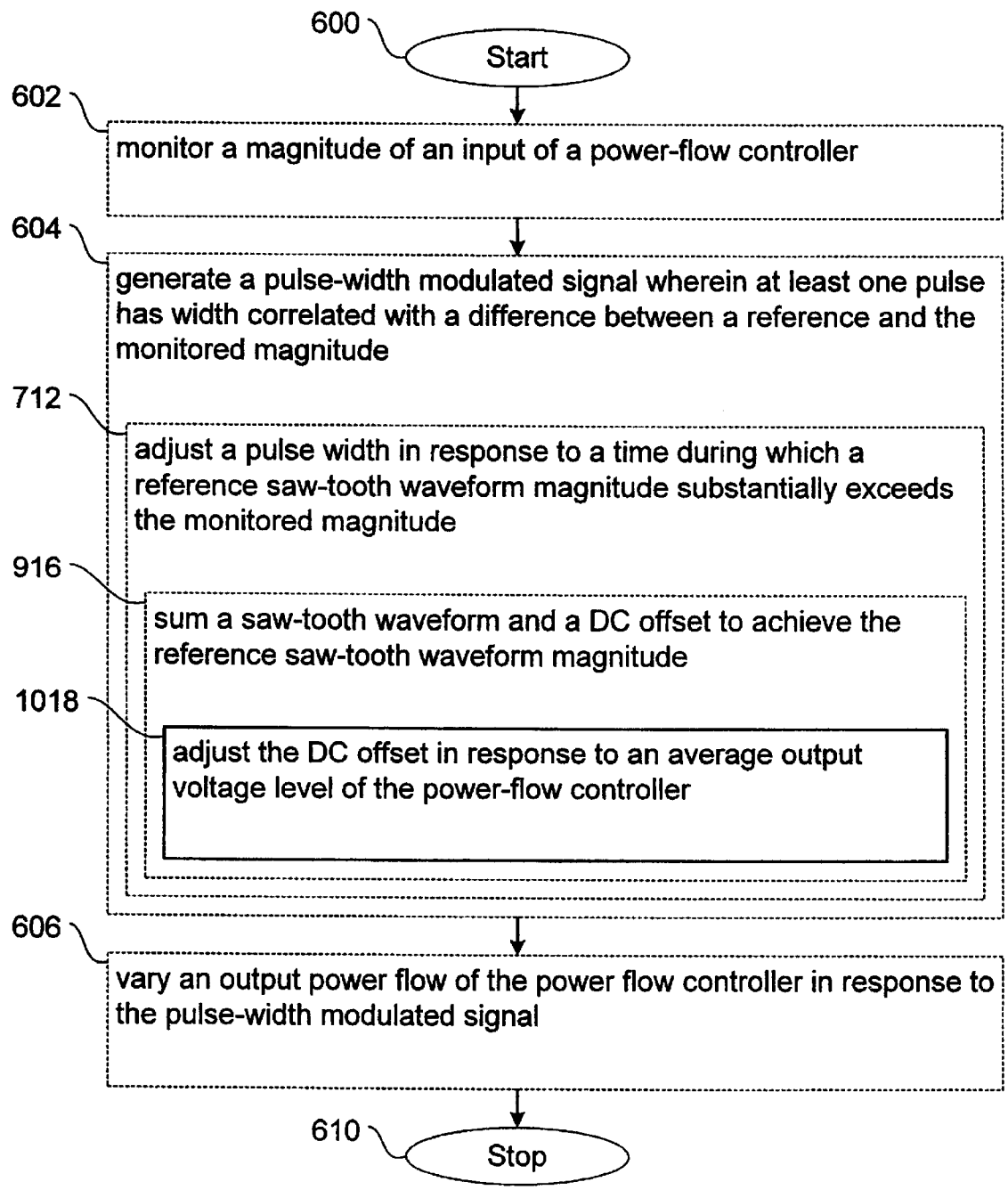
FIG. 10 shows a high-level logic flowchart depicting an alternate embodiment of the high-level logic flowchart of FIG. 9.

With reference now to FIG. 10, shown is a high-level logic flowchart depicting an alternate embodiment of the high-level logic flowchart of FIG. 9. Depicted is that in one embodiment method step 916 includes method sub-step 1018. Illustrated is that, in one embodiment, summing a saw-tooth waveform with a DC offset to achieve the reference saw-tooth waveform magnitude can include, but is not limited to, adjusting the DC offset in response to an average output voltage level of the power-flow controller. In various device embodiments, method step 1018 is achieved via components shown and described in relation to FIGS. 1D–1F, and FIGS. 2B–2C. In embodiments, method step 1018 is achieved via one or more control programs running on a numerical processor interacting with associated circuitry such as were described in relation to FIG. 5.

Figure 11:
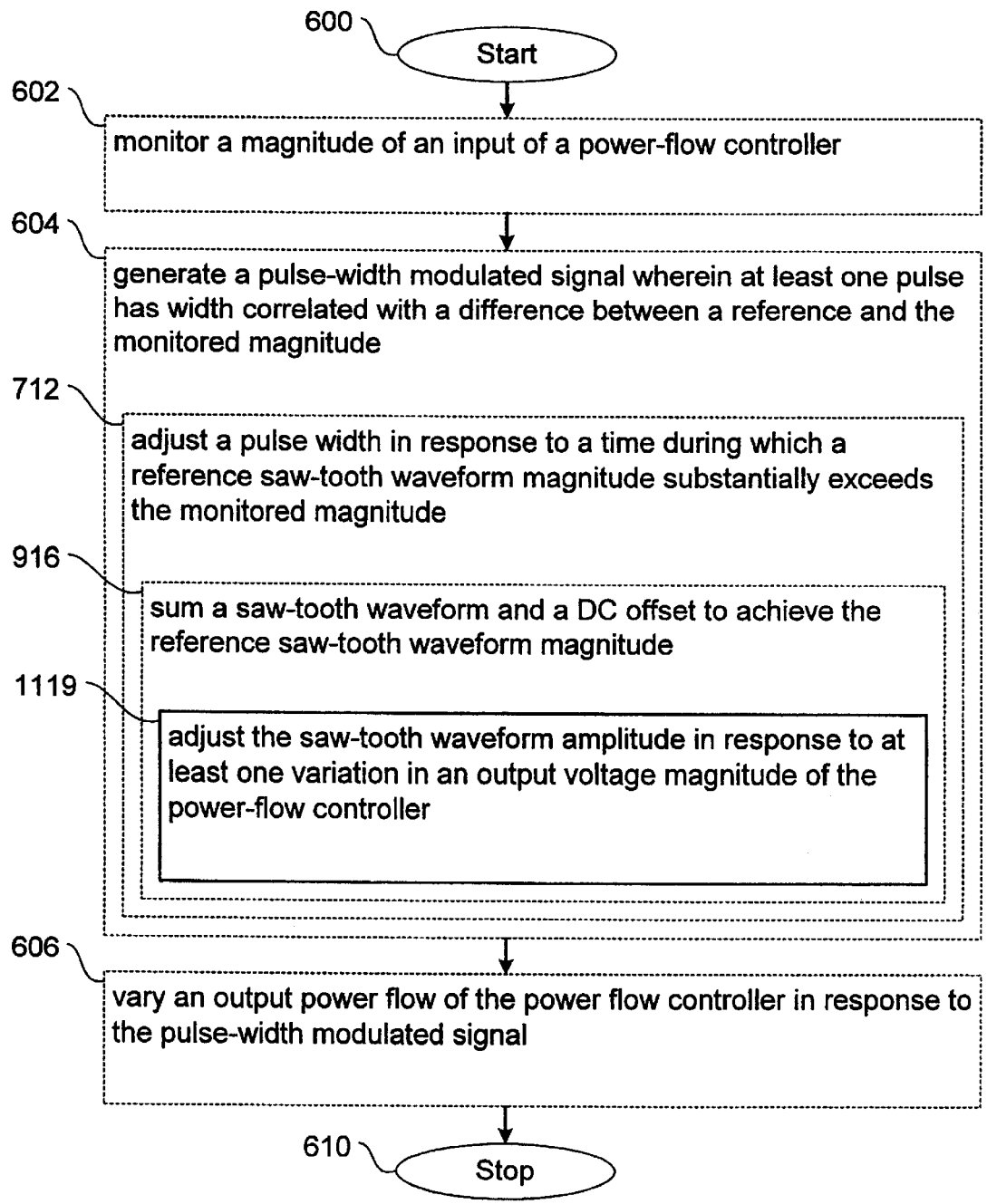
FIG. 11 shows a high-level logic flowchart depicting an alternate embodiment of the high-level logic flowchart of FIG. 9.

With reference now to FIG. 11, shown is a high-level logic flowchart depicting an alternate embodiment of the high-level logic flowchart of FIG. 9. Depicted is that in one embodiment method step 916 includes method sub-step 1119. Illustrated is that, in one embodiment, summing a saw-tooth waveform with a DC offset to achieve the reference saw-tooth waveform magnitude can include, but is not limited to, adjusting the saw-tooth waveform amplitude in response to at least one variation in an output voltage magnitude of the power-flow controller. In various device embodiments, method step 1119 is achieved via components shown and described in relation to FIGS. 1C and 1F, and FIG. 2C. In various other device embodiments, method step 1119 is achieved via one or more control programs running on a numerical processor interacting with associated circuitry such as were described in relation to FIG. 5.

Figure 12:
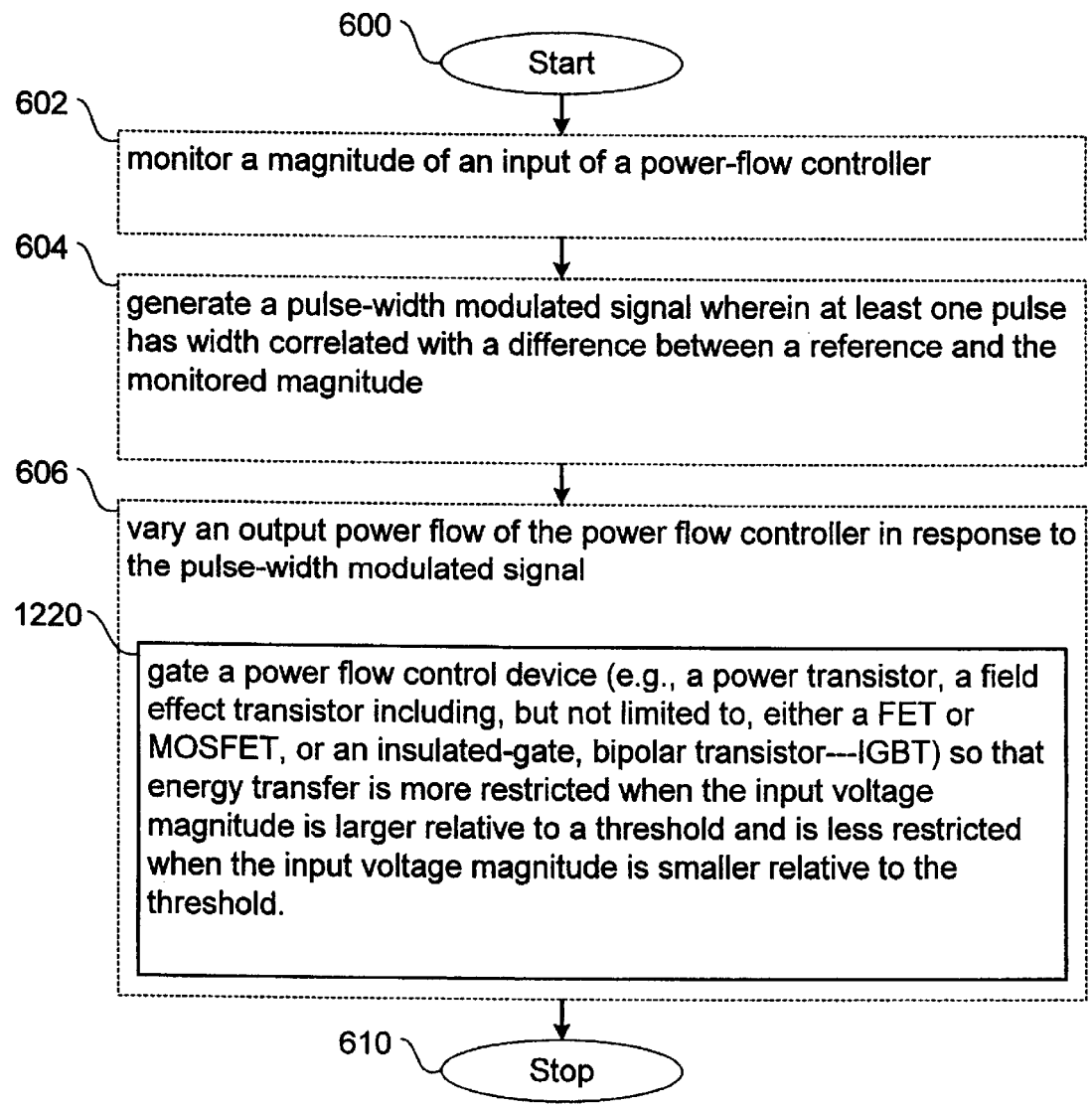
FIG. 12 shows a high-level logic flowchart depicting an alternate embodiment of the high-level logic flowchart of FIG. 6.

With reference now to FIG. 12, shown is a high-level logic flowchart depicting an alternate embodiment of the high-level logic flowchart of FIG. 6. Depicted is that in one embodiment method step 606 includes method sub-step 1220. Illustrated is that, in one embodiment, varying an output power flow of the power-flow controller in response to the pulse-width modulated signal can include, but is not limited to, gating a power flow control device selected from the power-flow-control-device group including but not limited to a power transistor, a field effect transistor (e.g., a FET or MOSFET), and an insulated-gate, bipolar transistor (IGBT), so that energy transfer is more restricted when the input voltage magnitude is larger relative to a threshold and is less restricted when the input voltage magnitude is smaller relative to the threshold. In various device embodiments, method step 1220 is achieved via components shown and described in relation to FIGS. 1C–1F, and FIGS. 2A–2C. In various other device embodiments, method step 1220 is achieved via one or more control programs running on a numerical processor interacting with associated circuitry such as were described in relation to FIG. 5.

Figure 13:
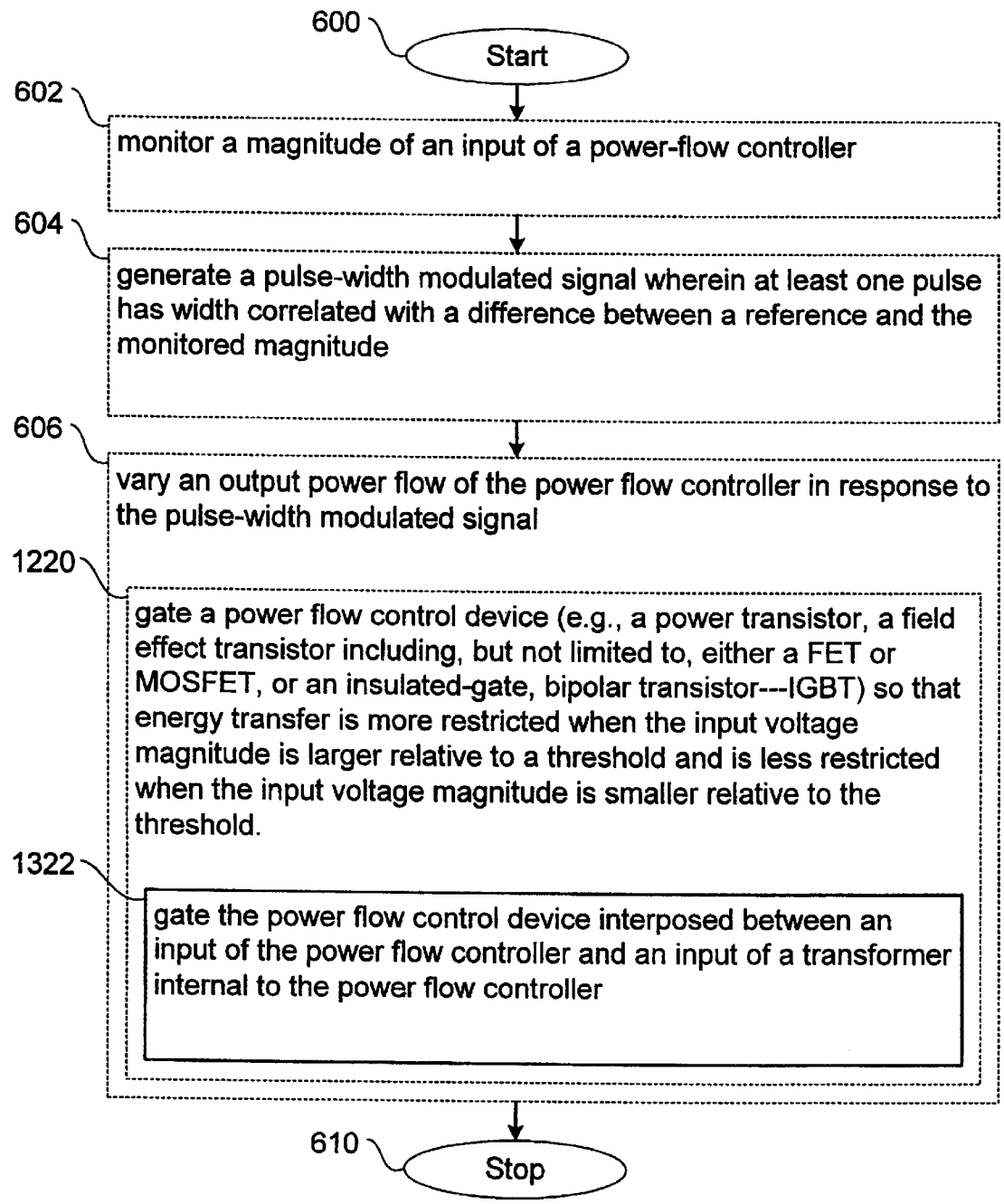
FIG. 13 shows a high-level logic flowchart depicting an alternate embodiment of the high-level logic flowchart of FIG. 12.

With reference now to FIG. 13, shown is a high-level logic flowchart depicting an alternate embodiment of the high-level logic flowchart of FIG. 12. Depicted is that in one embodiment method step 1220 includes method sub-step 1322. Illustrated is that, in one embodiment, gating a power flow control device selected from the power-flow-control-device group including but not limited to a power transistor, a field effect transistor (e.g., a FET or MOSFET), and an insulated-gate, bipolar transistor (IGBT) so that energy transfer is more restricted when the input voltage magnitude is larger relative to a threshold and is less restricted when the input voltage magnitude is smaller relative to the threshold can include, but is not limited to, gating the power flow control device interposed between an input of the power flow controller and an input of a transformer internal to the power-flow controller. In various device embodiments, method step 1322 is achieved via components shown and described in relation to FIGS. 1C–1F, and FIGS. 2A–2C. In various other device embodiments, method step 1322 is achieved via one or more control programs running on a numerical processor interacting with associated circuitry such as were described in relation to FIG. 5.

Figure 14:
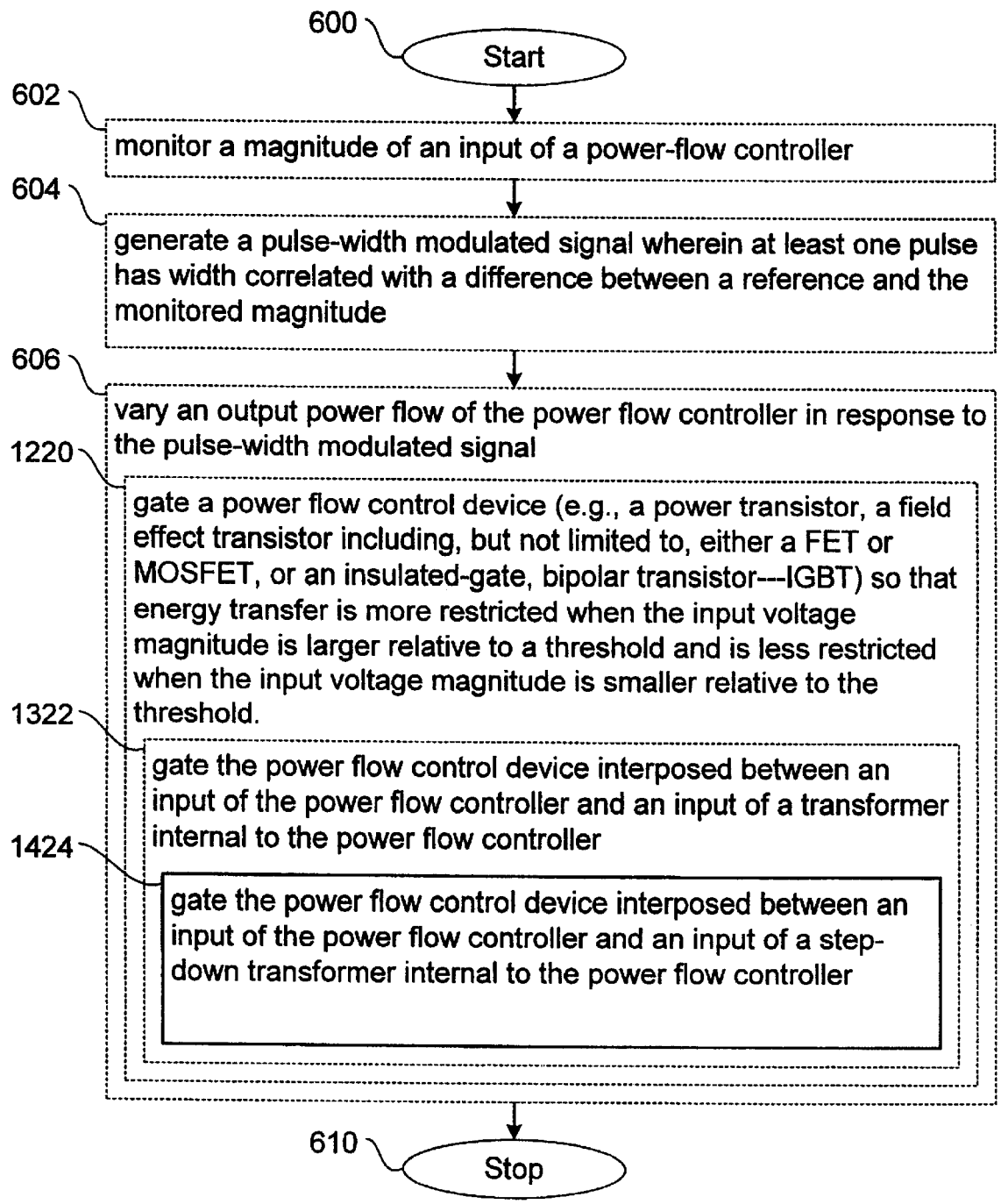
FIG. 14 shows a high-level logic flowchart depicting an alternate embodiment of the high-level logic flowchart of FIG. 13.

Referring now to FIG. 14, shown is a high-level logic flowchart depicting an alternate embodiment of the high-level logic flowchart of FIG. 13. Depicted is that in one embodiment method step 1322 includes method sub-step 1424. Illustrated is that, in one embodiment, gating the power flow control device interposed between an input of the power flow controller and an input of a transformer internal to the power-flow controller can include, but is not limited to, gating the power flow control device interposed between an input of the power flow controller and an input of a step-down transformer internal to the power-flow controller. In various device embodiments, method step 1424 is achieved via components shown and described in relation to FIGS. 1C–1F, and FIGS. 2A–2C. In various other device embodiments, method step 1424 is achieved via one or more control programs running on a numerical processor interacting with associated circuitry such as were described in relation to FIG. 5.

Figure 15:
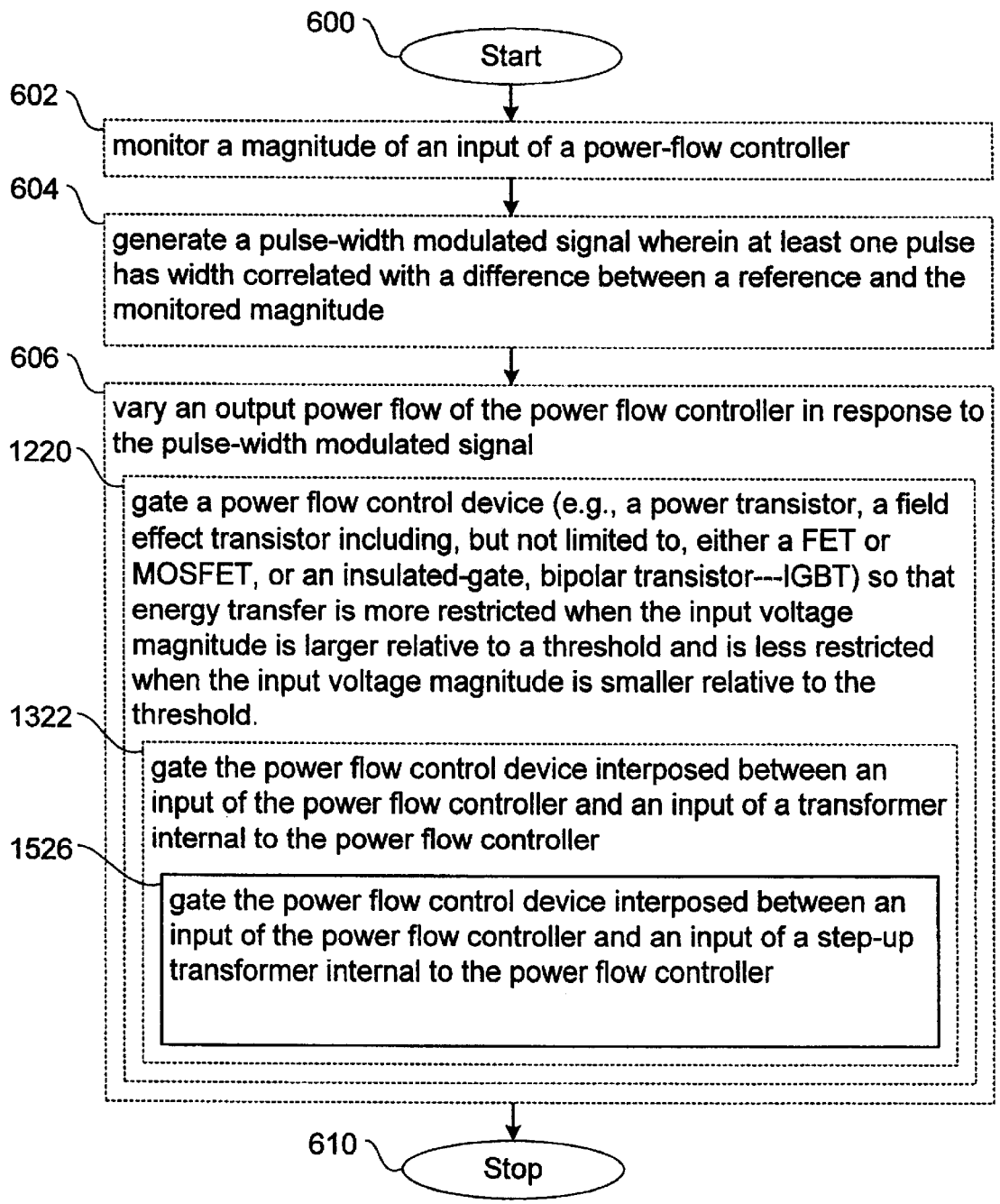
FIG. 15 shows a high-level logic flowchart depicting an alternate embodiment of the high-level logic flowchart of FIG. 13.

Referring now to FIG. 15, shown is a high-level logic flowchart depicting an alternate embodiment of the high-level logic flowchart of FIG. 13. Depicted is that in one embodiment method step 1322 includes method sub-step 1526. Illustrated is that, in one embodiment, gating the power flow control device interposed between an input of the power flow controller and an input of a transformer internal to the power-flow controller can include, but is not limited to, gating the power flow control device interposed between an input of the power flow controller and an input of a step-up transformer internal to the power-flow controller. In various device embodiments, method step 1526 is achieved via components shown and described in relation to FIGS. 1C–1F, and FIGS. 2A–2C. In various other device embodiments, method step 1526 is achieved via one or more control programs running on a numerical processor interacting with associated circuitry such as were described in relation to FIG. 5.

Figure 16:
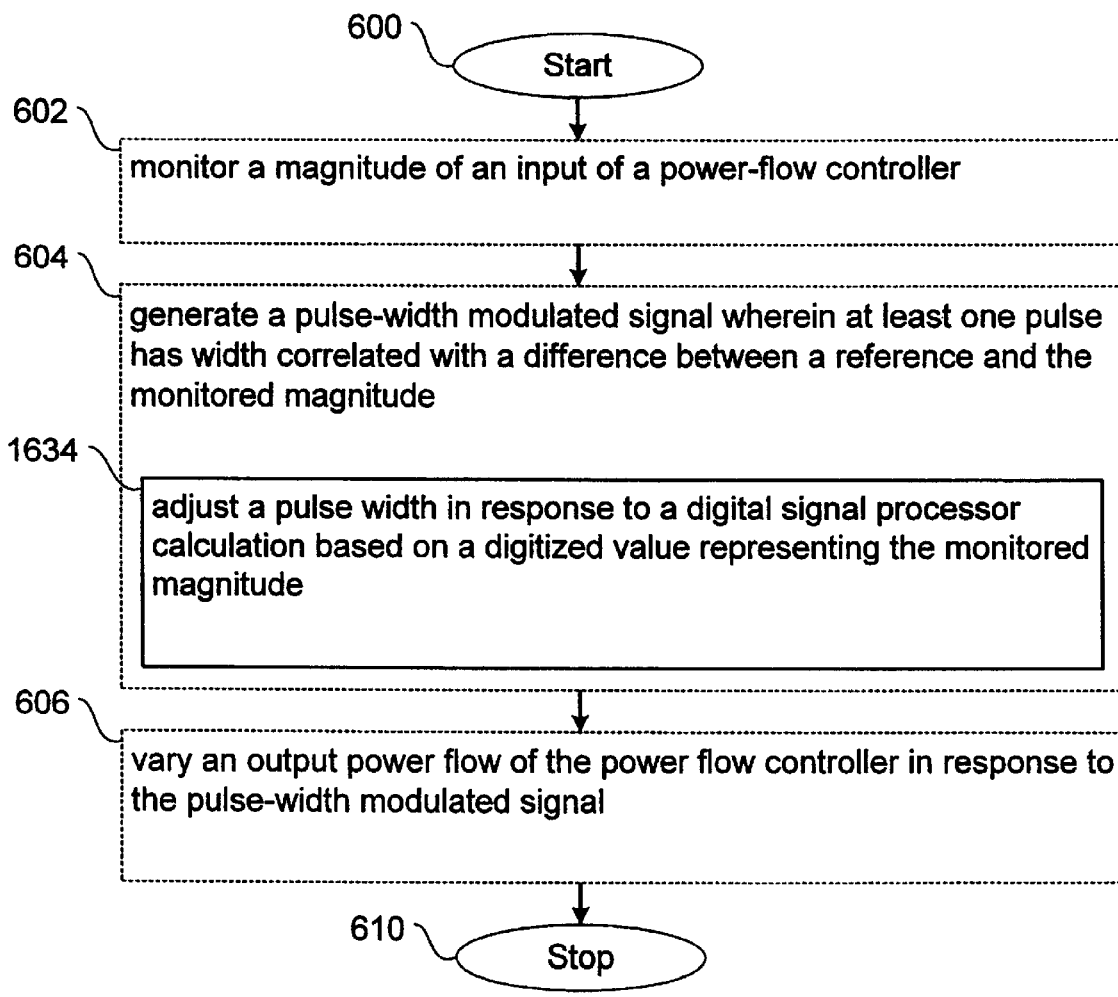
FIG. 16 shows a high-level logic flowchart depicting an alternate embodiment of the high-level logic flowchart of FIG. 6.

With reference now to FIG. 16, shown is a high-level logic flowchart depicting an alternate embodiment of the high-level logic flowchart of FIG. 6. Depicted is that in one embodiment method step 604 includes method sub-step 1634. Illustrated is that, in one embodiment, generating a pulse-width modulated signal wherein at least one pulse has width correlated with a difference between a reference and the monitored magnitude can include, but is not limited to, adjusting a pulse width in response to a digital signal processor calculation based on a digitized value representing the monitored magnitude. In various device embodiments, method step 1634 is achieved via one or more control programs running on a numerical processor interacting with associated circuitry such as were described in relation to FIG. 5.

Figure 17:
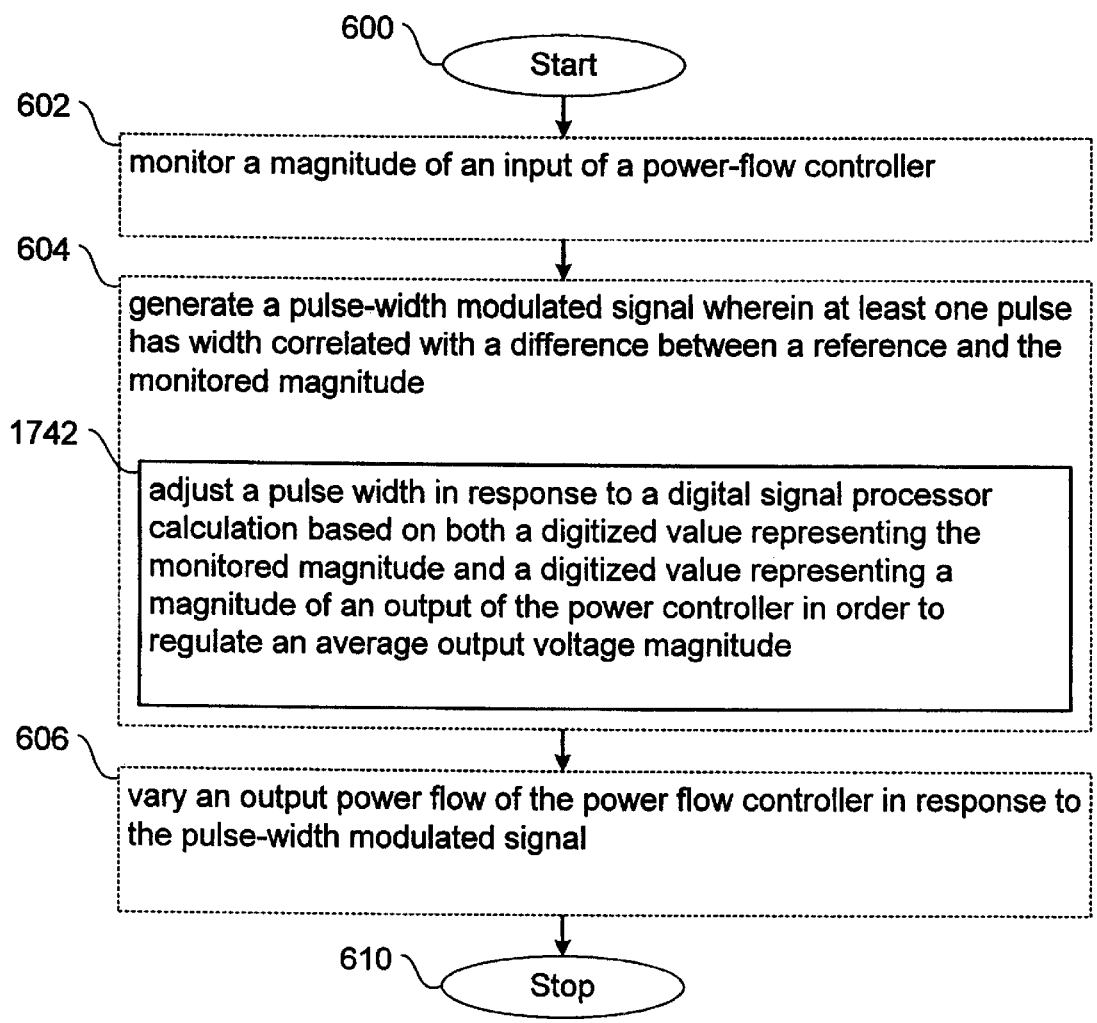
FIG. 17 shows a high-level logic flowchart depicting an alternate embodiment of the high-level logic flowchart of FIG. 6.

With reference now to FIG. 17, shown is a high-level logic flowchart depicting an alternate embodiment of the high-level logic flowchart of FIG. 6. Depicted is that in one embodiment method step 604 includes method sub-step 1742. Illustrated is that, in one embodiment, generating a pulse-width modulated signal wherein at least one pulse has width correlated with a difference between a reference and the monitored magnitude can include, but is not limited to, adjusting a pulse width in response to a digital signal processor calculation based on both a digitized value representing the monitored magnitude and a digitized value representing a magnitude of an output of the power controller in order to regulate an average output voltage magnitude. In various device embodiments, method step 1742 is achieved via one or more control programs running on a numerical processor interacting with associated circuitry such as were described in relation to FIG. 5.

Figure 18:
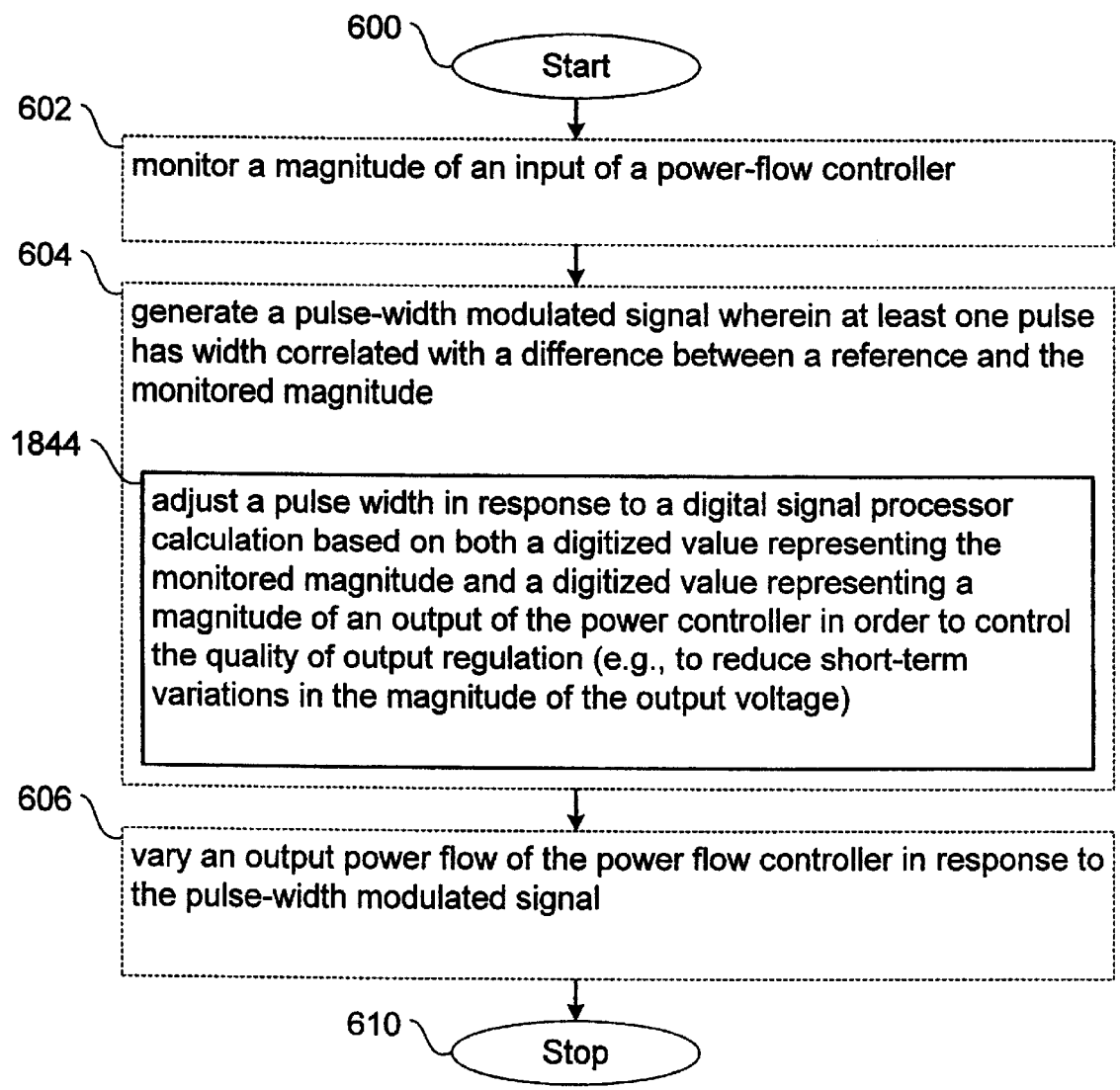
FIG. 18 shows a high-level logic flowchart depicting an alternate embodiment of the high-level logic flowchart of FIG. 6.

With reference now to FIG. 18, shown is a high-level logic flowchart depicting an alternate embodiment of the high-level logic flowchart of FIG. 6. Depicted is that in one embodiment method step 604 includes method sub-step 1844. Illustrated is that, in one embodiment, generating a pulse-width modulated signal wherein at least one pulse has width correlated with a difference between a reference and the monitored magnitude can include, but is not limited to, adjusting a pulse width in response to a digital signal processor calculation based on both a digitized value representing the monitored magnitude and a digitized value representing a magnitude of an output of the power controller in order to control the quality of output regulation (e.g., to reduce short-term variations in the magnitude of the output voltage). In various device embodiments, method step 1844 is achieved via one or more control programs running on a numerical processor interacting with associated circuitry such as were described in relation to FIG. 5.

While the preferred embodiment of the invention has been illustrated and described, it will be appreciated that various changes can be made therein without departing from the spirit and scope of the invention.

However, be that as it may, another application of the technique can be to use it to create a stepped-up version of a first-stage DC voltage, so the technique is not limited to only step-down applications.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having ordinary skill in the art will recognize that a typical data processing system generally includes at least a system unit housing, a video display device, a keyboard, and a mouse. A typical data processing system may be implemented utilizing any suitable commercially available computer system.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A method for use in a power converter, said method comprising:

monitoring a magnitude of an input of a power-flow controller;

generating a pulse-width modulated signal wherein at least one pulse has width correlated with a difference between a reference and the monitored magnitude, wherein said generating includes adjusting a pulse width in response to a time during which a reference saw-tooth waveform magnitude substantially exceeds the monitored magnitude, wherein said adjusting includes summing a saw-tooth waveform with a DC offset to achieve the reference saw-tooth waveform magnitude, wherein said summing includes adjusting the saw-tooth waveform amplitude in response to at least one variation in an output voltage magnitude of the power-flow controller; and varying an output power flow of the power-flow controller in response to the pulse-width modulated signal.

2. The method of claim 1, wherein the power converter comprises:

the power converter selected from a power-converter group including but not limited to a power supply, a power controller, and a power regulator.

3. The method of claim 1, wherein said adjusting a pulse width in response to a time during which a reference saw-tooth waveform magnitude substantially exceeds the monitored magnitude comprises:

triggering a leading edge of a pulse in response to the reference saw-tooth waveform magnitude substantially exceeding the monitored magnitude and triggering a trailing edge of the pulse in response to the reference saw-tooth waveform magnitude equaling or falling below the monitored magnitude.

4. The method of claim 1, wherein said summing a saw-tooth waveform with a DC offset to achieve the reference saw-tooth waveform magnitude comprises:

adjusting the DC offset in response to an average output voltage level of the power-flow controller.

5. The method of claim 1, wherein said varying an output power flow of the power-flow controller in response to the pulse-width modulated signal comprises:

gating a power flow control device selected from the power-flow-control-device group including but not limited to a power transistor, a field effect transistor, and an insulated-gate, bipolar transistor where said gating is such that energy transfer is more restricted when the input voltage magnitude is larger relative to a threshold and is less restricted when the input voltage magnitude is smaller relative to the threshold.

6. The method of claim 5, wherein said gating a power flow control device comprises:

gating the power flow control device interposed between an input of the power flow controller and an input of a transformer internal to the power-flow controller.

7. The method of claim 6, wherein said gating the power flow control device interposed between an input of the power flow controller and an input of a transformer internal to the power-flow controller comprises:

gating the power flow control device interposed between an input of the power flow controller and an input of a step-down transformer internal to the power-flow controller.

8. The method of claim 6, wherein said gating the power flow control device interposed between an input of the power flow controller and an input of a transformer internal to the power-flow controller comprises:

gating the power flow control device interposed between an input of the power flow controller and an input of a step-up transformer internal to the power-flow controller.

9. The method of claim 1, wherein said generating a pulse-width modulated signal wherein at least one pulse has width correlated with a difference between a reference and the monitored magnitude comprises:

adjusting a pulse width in response to a digital signal processor calculation based on a digitized value representing the monitored magnitude.

10. The method of claim 1, wherein said generating a pulse-width modulated signal wherein at least one pulse has width correlated with a difference between a reference and the monitored magnitude comprises:

adjusting a pulse width in response to a digital signal processor calculation based on both a digitized value representing the monitored magnitude and a digitized value representing a magnitude of an output of the power controller in order to regulate an average output voltage magnitude.

11. The method of claim 1, wherein said generating a pulse-width modulated signal wherein at least one pulse has width correlated with a difference between a reference and the monitored magnitude comprises:

adjusting a pulse width in response to a digital signal processor calculation based on both a digitized value representing the monitored magnitude and a digitized value representing a magnitude of an output of the power controller in order to control the quality of output regulation (e.g., to reduce short-term variations in the magnitude of the output voltage).

12. A system for use in a power converter, said system comprising:

means for monitoring a magnitude of an input of a power-flow controller;

means for generating a pulse-width modulated signal wherein at least one pulse has width correlated with a difference between a reference and the monitored magnitude, wherein said means for generating includes means for adjusting a pulse width in response to a time during which a reference saw-tooth waveform magnitude substantially exceeds the monitored magnitude, wherein said means for adjusting includes means for summing a saw-tooth waveform with a DC offset to achieve the reference saw-tooth waveform magnitude, wherein said means for summing includes means for adjusting the saw-tooth waveform amplitude in response to at least one variation in an output voltage magnitude of the power-flow controller; and means for varying an output power flow of the power-flow controller in response to the pulse-width modulated signal.

13. The system of claim 12, wherein the power converter comprises:

the power converter selected from a power-converter group including but not limited to a power supply, a power controller, and a power regulator.

14. The system of claim 12, wherein said means for adjusting a pulse width in response to a time during which a reference saw-tooth waveform magnitude substantially exceeds the monitored magnitude comprises:

means for triggering a leading edge of a pulse in response to the reference saw-tooth waveform magnitude substantially exceeding the monitored magnitude and triggering a trailing edge of the pulse in response to the reference saw-tooth waveform magnitude equaling or falling below the monitored magnitude.

15. The system of claim 12, wherein said means for summing a saw-tooth waveform with a DC offset to achieve the reference saw-tooth waveform magnitude comprises:

means for adjusting the DC offset in response to an average output voltage level of the power-flow controller.

16. The system of claim 12, wherein said means for varying an output power flow of the power-flow controller in response to the pulse-width modulated signal comprises:

means for gating a power flow control device selected from the power-flow-control-device group including but not limited to a power transistor, a field effect transistor, and an insulated-gate, bipolar transistor where said gating is such that energy transfer is more restricted when the input voltage magnitude is larger relative to a threshold and is less restricted when the input voltage magnitude is smaller relative to the threshold.

17. The system of claim 16, wherein said means for gating a power flow control device comprises:

means for gating the power flow control device interposed between an input of the power flow controller and an input of a transformer internal to the power-flow controller.

18. The system of claim 17, wherein said means for gating the power flow control device interposed between an input of the power flow controller and an input of a transformer internal to the power-flow controller comprises:

means for gating the power flow control device interposed between an input of the power flow controller and an input of a step-down transformer internal to the power-flow controller.

19. The system of claim 17, wherein said means for gating the power flow control device interposed between an input of the power flow controller and an input of a transformer internal to the power-flow controller comprises:

means for gating the power flow control device interposed between an input of the power flow controller and an input of a step-up transformer internal to the power-flow controller.

20. The system of claim 12, wherein said means for generating a pulse-width modulated signal wherein at least one pulse has width correlated with a difference between a reference and the monitored magnitude comprises:

means for adjusting a pulse width in response to a digital signal processor calculation based on a digitized value representing the monitored magnitude.

21. The system of claim 12, wherein said means for generating a pulse-width modulated signal wherein at least one pulse has width correlated with a difference between a reference and the monitored magnitude comprises:

means for adjusting a pulse width in response to a digital signal processor calculation based on both a digitized value representing the monitored magnitude and a digitized value representing a magnitude of an output of the power controller in order to regulate an average output voltage magnitude.

22. The system of claim 12, wherein said means for generating a pulse-width modulated signal wherein at least one pulse has width correlated with a difference between a reference and the monitored magnitude comprises:

means for adjusting a pulse width in response to a digital signal processor calculation based on both a digitized value representing the monitored magnitude and a digitized value representing a magnitude of an output of the power controller in order to control the quality of output regulation (e.g., to reduce short-term variations in the magnitude of the output voltage).

23. A power converter comprising:

a forward-looking control device, wherein said forward-looking control device includes a power-converter-output-voltage ripple control circuit, wherein said power-converter-output-voltage ripple control circuit includes a ripple detector circuit, a voltage controlled amplifier circuit, and a reference voltage circuit.

24. The power converter of claim 23, further comprising:

the power converter selected from a power-converter group including but not limited to a power supply, a power controller, and a power regulator.

25. The power converter of claim 23, further comprising:

said forward-looking control device operably coupled to a quasi-DC power input of a power controller.

26. The power converter of claim 25, further comprising:

said forward-looking control device operably coupled to an output of the power converter.

27. The power converter of claim 23, wherein said forward-looking control device comprises:

a pulse-width control circuit.

28. The power converter of claim 27, wherein said pulse-width control circuit comprises:

a comparator circuit; and a reference voltage circuit.

29. The power converter of claim 23, wherein said forward-looking control device comprises:

an average power-converter-output-voltage control circuit.

30. The power converter of claim 29, wherein said average power-converter-output-voltage control circuit comprises:

a reference amplifier and filter circuit;

an offset adjust circuit; and a reference voltage circuit.

* * * * *